US006976524B2

(12) United States Patent
Walsh

(10) Patent No.: US 6,976,524 B2
(45) Date of Patent: Dec. 20, 2005

(54) APPARATUS FOR MAXIMUM WORK

(76) Inventor: Paul J. Walsh, 4736 E. Apricot La., Gilbert, AZ (US) 85297

( * ) Notice: Subject to any disclaimer, the term of this patent is extended or adjusted under 35 U.S.C. 154(b) by 87 days.

(21) Appl. No.: 10/694,416

(22) Filed: Oct. 27, 2003

(65) Prior Publication Data
US 2005/0086958 A1 Apr. 28, 2005

(51) Int. Cl.$^7$ .............................................. F25B 29/00
(52) U.S. Cl. ............................ 165/63; 62/177; 62/430; 236/12.1
(58) Field of Search ........................ 62/159, 177, 238.6, 62/238.7, 430, 324.1; 165/61–64; 236/12.1

(56) References Cited

U.S. PATENT DOCUMENTS

| 2,930,593 | A | 3/1960 | Blum |
|---|---|---|---|
| 3,024,008 | A | 3/1962 | Blum |
| 3,069,867 | A | 12/1962 | Ringquist |
| 3,167,116 | A | 1/1965 | Egbert |
| 3,171,471 | A | 3/1965 | Blum |
| 3,176,759 | A | 4/1965 | Windham |
| 3,191,667 | A | 6/1965 | Lorenz |
| 3,191,668 | A | 6/1965 | Lorenz |
| 3,198,245 | A | 8/1965 | Soling |
| 3,288,205 | A | 11/1966 | Egbert |
| 3,628,600 | A | 12/1971 | McFarlan |
| 3,636,721 | A | 1/1972 | Rex |
| 3,670,806 | A | 6/1972 | McFarlan |
| 3,712,026 | A | 1/1973 | Griffiths et al. |
| 3,729,051 | A | 4/1973 | Mannion et al. |
| 3,833,057 | A | 9/1974 | Doherty |
| 3,850,007 | A | 11/1974 | McFarlan |
| 3,853,172 | A | 12/1974 | McFarlan |
| 3,877,513 | A | 4/1975 | Arledge, Jr. |
| 3,908,750 | A | 9/1975 | Siegel |
| 3,910,345 | A | 10/1975 | Whalen |
| 4,010,624 | A | 3/1977 | McFarlan |
| 4,413,478 | A | 11/1983 | McFarlan |
| 4,419,864 | A | 12/1983 | McFarlan |
| 4,559,788 | A | 12/1985 | McFarlan |
| 4,718,478 | A | 1/1988 | Huber |
| 5,953,926 | A | 9/1999 | Dressler et al. |

(Continued)

FOREIGN PATENT DOCUMENTS

| EP | 0766051 A1 | 5/1995 |
|---|---|---|
| WO | WO 89/04443 | 5/1989 |

*Primary Examiner*—William E. Tapolcai
(74) *Attorney, Agent, or Firm*—Hodgson Russ LLP

(57) ABSTRACT

An apparatus for maximum work comprising central equipment comprising a refrigeration machine, a water heater, an evaporative cooler and hot and cold storage tanks. Airside equipment for providing supply air to a room or zone. A hot supply/return pipe, a cold supply pipe, and a cold return pipe. A water blending circuit comprising a hot supply runout pipe extending from the hot supply/return pipe and a cold supply runout pipe extending from the cold supply pipe, wherein the water blending circuit further comprises an upstream two position three way changeover valve comprising a first port, a second port, and a third port. The hot supply runout pipe connects to first port and the cold supply runout pipe connects to the second port. A modulating three way zone blending valve connected to the third port of the upstream two position three way valve, and a blending pump for pumping water through a roomside coil, so that return water exits the coil through a return pipe. A zone thermostat positioned to sense a temperature of the zone, and a return water thermostat to sense a temperature of the coil return water, the return water thermostat for controlling the temperature and amount of coil return water that is re-pumped through the coil by controlling the amount that the modulating three way zone blending valve is open or closed to the flow of coil return water, with a downstream two position three way changeover valve for directing the flow of return water.

14 Claims, 14 Drawing Sheets

U.S. PATENT DOCUMENTS

| | | |
|---|---|---|
| 6,199,388 B1 | 3/2001 | Fischer, Jr. |
| 6,601,773 B2 * | 8/2003 | Saitoh et al. ............... 237/2 B |
| 6,659,361 B2 * | 12/2003 | Sasayama et al. ............ 237/28 |
| 6,688,129 B2 * | 2/2004 | Ace ............................ 62/260 |
| 6,735,967 B1 * | 5/2004 | Bischel et al. ............. 62/196.4 |
| 6,792,766 B2 * | 9/2004 | Osborne et al. .............. 62/159 |

* cited by examiner

| Symbol | Description |
|---|---|
| ——CS—— | COLD WATER SUPPLY PIPE |
| ----CR---- | COLD WATER RETURN PIPE |
| —HS/REG— | HOT WATER COMBINATION SUPPLY & RETURN PIPE |
| ——EG—— | ETHYLENE GLYCOL SUPPLY OR RETURN PIPE |
| O.A. | OUTSIDE AIR |
| S.A. | SUPPLY AIR (48 DEG. DRY BULB. YEAR ROUND) |
| R/E | RETURN / EXHAUST AIR TO EVAPORATIVE COOLER |
| D.A. | DISCHARGE AIR TO ATMOSPHERE |
| ET-1 | SYSTEM EXPANSION TANK |
| ET-2 | RUNAROUND COILS EXPANSION TANK |
| ET-3 | EVAPORATIVE COOLER EXPANSION TANK |
| /\/\/\/\ | HEAT EXCHANGER |
| HX-1 | SPRAYED COIL / HUMIDIFICATION HEAT SOURCE HEAT EXCHANGER |
| HX-2 | SALVAGE ENERGY TO REMOTE HEATING LOADS HEAT EXCHANGER |
| HX-3 | HOT WATER / ETHYLENE GLYCOL / EVAPORATIVE COOLER HEAT EXCHANGER |
| $V_B$ | MODULATING 3 WAY, ZONE BLENDING VALVE |
| $V_1$ | MODULATING 3 WAY, MIXING VALVE (AIR SIDE HEATING HUMIDIFICATION AND COOLING COIL) |
| $V_2$ | MODULATING 3 WAY, MIXING VALVE (ROOM SIDE COLD WATER LOOP) |
| $V_3$ | 2 POSITION 3 WAY CHANGE OVER VALVE (UP STREAM OF ROOM SIDE EQUIPMENT) |
| $V_4$ | 2 POSITION 3 WAY DIVERTING VALVE |
| $V_{3A}$ | 2 POSITION 3 WAY CHANGE OVER VALVE (DOWN STREAM OF ROOM SIDE EQUIPMENT) |

PUMP AS FOLLOWS

ALL PUMPS ARE CONSTANT SPEED UNLESS OTHERWISE INDICATED
* INDICATES VARIABLE SPEED DRIVE PUMP
** INDICATES PUMP CONTROLLED BY A DISCHARGE PRESSURE CONTROLLER
√ INDICATES PUMPS ARE CONTROLLED BY TEMPERATURE

- PUMP B – BLENDING PUMP, ROOM SIDE EQUIPMENT
- PUMP 1 – COLD WATER, EVAPORATOR PRIMARY LOOP
- PUMP 2 – COLD WATER SUPPLY TO AIRSIDE EQUIPMENT COOLING COIL
- √* PUMP 3 – COOLING COIL SPRAY PUMP
- ** PUMP 4 – COLD WATER SUPPLY TO ROOM SIDE LOOP
- PUMP 5 – COLD WATER STORAGE TANK BYPASS
- PUMP 6 – HOT WATER COMBINATION SUPPLY / RETURN LOOP
- PUMP 7 – WATER HEATER BYPASS
- √* PUMP 8 – HX-1 BYPASS
- √* PUMP 9 – PREHEAT / PRE COOL RUN AROUND COIL LOOP

FIG. 2a

PUMP 10 - HX-2 BYPASS
PUMP 11 - HX-2 SALVAGE ENERGY, SUPPLY / RETURN LOOP
PUMP 12 - HOT WATER STORAGE TANK BYPASS
PUMP 13 - HX-3 BYPASS
PUMP 14 - EVAPORATIVE COOLER LOOP (HOT WATER, HX-2, ETHYLENE GLYCOL)
PUMP 15 - EVAPORATIVE COOLER SPRAY PUMP
PUMP 16 - HX-1 SECONDARY LOOP (HUMIDIFICATION HEATING SOURCE)

THERMOSTAT AS FOLLOWS

T1 - COLD WATER SUPPLY FROM EVAPORATOR, 40 DEGREES SUMMER, RAMP TO 52° WINTER
T2 - AIR SIDE SUPPLY AIR, 48 DEGREES DRY BULB, WET BULB, DEW POINT YEAR ROUND
T3 - COLD WATER SUPPLY TO ROOM SIDE EQUIPMENT, 52 DEGREES YEAR ROUND
T4 - COLD WATER STORAGE TANK
T5 - HOT WATER SUPPLY 95 DEGREES SUMMER, RAMP UP TO 120 DEGREES WINTER
T6 - HOT WATER STORAGE TANK
T7 - OUTSIDE TEMPERATURE
T8 - REHEAT COIL DISCHARGE TEMPERATURE
T9 - RUN AROUND PREHEAT COIL DISCHARGE TEMPERATURE
TZ - ROOM SIDE ZONE THERMOSTAT

FIG. 2b

APPARATUS FOR MAXIMUM WORK

FIELD OF INVENTION

The present invention relates to the field of heating and cooling buildings and methods of controlling humidity levels inside the buildings.

BACKGROUND

In the air conditioning, heating, and refrigeration (AHR) of buildings, a mechanical system is used to maintain space or room conditions within the structure. These systems produce dry bulb temperatures, wet bulb temperatures, relative humidity (RH), air filtration, and outside air ventilation for the structure or building in which they are used.

However, offices, buildings, nursing homes, schools, auditoriums, enclosed spaces, and other structures are heated and cooled using systems that may not provide the most healthful air for people to breathe. For example, fungi may establish colonies in the system. In particular, the fungi may establish colonies in ventilation ducts and/or on the cooling coils and in the drain pans used in the system. Then, when air circulates through the system it picks up the fungi and building occupants unknowingly inhale the fungi.

Additionally, many ventilation systems are designed to repeatedly circulate the same air through the system, taking in and exhausting only a minimal amount of air. Thus, in these systems the same air is repeatedly blown through coils/ducts and over drain pans which might be coated with fungi. Such ventilation systems may cause significant problems in hospitals, schools, nursing homes, research labs, factories, apartments, offices, occupied buildings, enclosed spaces, and structures where clean air is needed.

There is thus a growing need to provide air for hospitals, schools, offices, and other buildings in which the air quality is high and the humidity level is always comfortable for building occupants. Thus, it would be desirable to create a heating and cooling apparatus that avoids the problems associated with recirculating air in buildings. It would also be desirable to provide clean comfortable air to building occupants. It would also be desirable if the apparatus was able to minimize energy consumption, while at the same time provide for all heating and cooling needs of the structure or building.

SUMMARY

The present apparatus for maximum work provides for heating and cooling of room spaces or zones and comprises airside equipment, central equipment, and roomside equipment.

The airside equipment, which may be mounted on the rooftop of the building, draws outside air into the airside equipment room. In the airside equipment room the incoming outside air is brought to the required dry bulb, wet bulb, and dew point temperature as it is drawn through a plurality of coils.

Located in the airside equipment room is a runaround coil section and a runaround coil loop comprising a supply air coil and a return/exhaust air coil. Outside air moves through the supply air coil year round, and return/exhaust air moves through the return/exhaust air coil year round. The supply air coil is also referred to as the supply air runaround preheating/precooling coil, and the return/exhaust air coil is also referred to as a return/exhaust (R/E) air runaround heating/cooling coil. The runaround coil loop is for preheating or precooling incoming outside air. The runaround coil loop is filled with ethylene glycol or glycol formulation or other suitable fluid, and is pumped by the preheat/precool runaround coil loop variable frequency drive (hereinafter VFD) pump. The runaround coil loop VFD pump pumps in both the summer and winter, that is, year round. Thus, in the winter the supply air coil serves as a heating coil and heats incoming outside air because the glycol in its coil is constantly being replaced with warm glycol supplied from the return/exhaust air coil. In the summer the opposite occurs, and the supply air coil serves as a cooling coil and cools hot incoming outside air because the glycol in its coil is constantly being replaced with cool glycol supplied from the return/exhaust air coil. Since the return/exhaust air is used for both preheating and precooling of the outside air, the apparatus for maximum work uses less energy to operate.

The airside equipment room further comprises a roomside equipment coil comprising a reheat/recooling coil section (rows 5–8 of the roomside coil) and a sprayed cooling coil section (rows 1–4 of the roomside coil).

In the summer condition, the outside air drawn into the airside equipment room may be, for example, 95° Fahrenheit. This air initially passes through the supply air runaround preheating/precooling coil in the runaround coil section. The temperature of the incoming air may be dropped to about 86° Fahrenheit. The air is then moved through the airside equipment coil. A refrigeration machine is provided and cold water from the refrigeration machine's evaporator is pumped through an evaporator loop. Water from the loop is drawn though a pipe to an airside modulating three way mixing valve by an airside pump. The airside pump is downstream of the modulating three way mixing valve. The cold water pumped from the evaporator may be about 40° Fahrenheit since it is the summer. The cold water is pumped by the airside pump through a two position three way diverting valve. The cold water is then pumped through a sprayed cooling coil (rows 1–4 of the airside equipment coil) in a sprayed cooling coil section of the airside equipment. Continuing with the summer condition, the cold water next is pumped through a reheat/recooling coil (rows 5–8 of the airside equipment coil) in a reheat/recooling coil section of the airside equipment room.

After moving through the supply air runaround preheating/precooling coil, the air is then moved through the reheat/recooling coil in the reheat/recooling coil section of the airside equipment room, and then through the sprayed cooling coil in the sprayed cooling coil section of the airside equipment room. As the air moves through these coils it is both cooled and brought to the desired wet bulb, dry bulb, and dew point temperature. The incoming air is conditioned until it is at about a 48° Fahrenheit dry bulb, wet bulb, and dew point temperature, and has a relative humidity of 100%. To achieve this state, the airside supply air thermostat T2 is set at a 48° Fahrenheit dry bulb and wet bulb temperature year round. After the air has passed through the coils it becomes supply air (SA) and is then pumped though ducts to roomside equipment. As for the water in the reheat/recooling coil, it exits the airside equipment room at about 52° Fahrenheit and is returned to the evaporator water primary loop.

In the winter cycle the supply air runaround preheat/precooling coil warms the incoming air in the manner described above. Cold water is not required to condition the air thus the airside modulating three way mixing valve is closed to the flow of incoming cold water from the refrigeration machine. Also, in the winter cycle the two position three way diverting valve is closed such that there is no water flow through the sprayed cooling coil (rows 1–4 of the airside equipment coil). However, the two position three way diverting valve is open so that warm water pumped by airside equipment pump mixes with HX-1 secondary heated water, passes through the two position three way diverting valve, the reheat/recooling coil (rows 5–8 of the airside equipment coil), the modulating three way mixing valve, and back to the airside pump. Thus, the warm water is pumped through the reheat/recooling coil section in the winter condition. Then, after passing through the reheat/recooling coil section, the temperature of the air may be about 75° Fahrenheit. However this air, which may be dry, then moves through the sprayed coil section (rows 1–4 of the airside equipment coil) where it is cooled and brought to the desired temperature and humidity. There is no water flow through the sprayed cooling coil in the winter cycle as the diverting valve prevents such water flow.

In connection with the above, in the winter the airside supply air thermostat operates to deliver supply air at about a 48° Fahrenheit dry bulb, wet bulb, and dew point temperature, which is the same as the above-described summer supply air conditions.

Thus, the airside equipment delivers supply air having the above-described properties to the ducts, and the ducts deliver the supply air to the roomside equipment. The airside equipment may comprise a fan coil unit, an induction unit, and a radiant ceiling. The ducts therefore deliver the supply air to the roomside spaces, enclosed regions or areas, or zones to be conditioned.

To further condition to roomside spaces or zones, a three pipe system is provided that comprises a hot supply/return piping loop, a cold supply piping loop, and a cold return piping loop. The refrigeration machine provides a heat source and a heat sink for the apparatus for maximum work and the three pipes lead to and from the refrigeration machine. The above described supply air is used in combination with this three pipe system. In particular, the supply air and roomside water blending circuits provide for year round conditioning of zones or spaces.

The roomside equipment comprises induction units, radiant ceilings, and fan coil units, each unit works with an identical water blending circuit. A cold supply runout pipe and a cold return runout pipe connect to the cold supply piping loop (CS) and the cold return piping loop (CR). A hot supply runout pipe and hot return runout pipe connect to the hot supply/return piping loop (HS/R). The cold supply runout and hot supply runout connect to the two ports of an upstream two position three way changeover valve that allows either hot or cold water to flow to there-through to a downstream modulating three way zone blending valve. The outlet of the modulating three way valve zone blending valve connects to a blending pump. The constant flow blending pump pumps water to a coil inlet and then through the roomside equipment coil. A roomside equipment coil is utilized in each of the induction unit, radiant ceiling, and the fan coil unit.

The roomside zones or spaces each comprise a roomside zone thermostat designated TZ. The roomside zone thermostat TZ is for sensing the temperature of the air in the room space or zone. The other thermostat is a roomside fluid return thermostat designated TR, which senses the temperature of the coil return water that is returning from the roomside equipment coil. Electronic signals are sent from the roomside zone thermostat TZ indicating what the room temperature is to be maintained or if a change in room temperature is needed (heating or cooling).

The return water thermostat TR, because it senses the temperature of the return water, can control the modulating three way zone blending valve to behave a plurality of different ways. For example, the modulating three way zone blending valve may direct all the return water flowing from the coil outlet, or any percentage thereof, as directed by the return thermostat designated TR to flow to the second inlet port of the modulating three way zone blending valve, and be pumped again through the roomside equipment coil. Additionally, the modulating three way zone blending valve may close to the flow of return water so all the return water flowing from the coil outlet flows to the downstream two position three way changeover valve. From there the water may be directed to the cold return piping loop (hereinafter CR) or hot supply/return piping loop return pipe (hereinafter HS/R). Thus, energy savings may be achieved because the return water may be recirculated through the roomside equipment coil until the return water has either absorbed heat from the room or space, or has delivered its heat to the room or space.

In the winter months, the hot water is returned to the hot supply/return pipe at about 85° Fahrenheit and from there back to the condenser of the refrigeration machine. In the summer months the cold water is returned to the cold return piping loop (hereinafter CR) at about at about 64° Fahrenheit. From there it is piped to the modulating three way mixing valve and to the evaporator primary loop of the refrigeration machine.

The apparatus is also provided with a salvage energy heat exchanger so that any excess heat generated may be delivered to other locations for other purposes, for example domestic hot water, snow melting, heating remote buildings, and other similar uses.

Also, once the supply air passes out of the ducts into the roomside equipment, spaces, zones, or enclosed areas a quantity of this zone air equal to the supply air quantity is exhausted from the zone through the return/exhaust (hereinafter R/E) register to the ceiling cavity and is returned to the R/E section. From there the return/exhaust (R/E) air is discharged through the R/E runaround coil and out to the evaporative cooler section. The return/exhaust air is not recirculated through the apparatus. This decreases the likelihood of harmful fungi and pathogens building up in the coils and ducts of the apparatus. Also, due to the configuration of the apparatus, a minimal amount or energy is wasted.

A means for control is provided to control all the valves, pumps, pressure regulators, sensors and other elements of the apparatus for maximum work.

BRIEF DESCRIPTION OF THE DRAWINGS

FIGS. 2a and 2b show a symbol list detailing the symbols shown in FIGS. 1.

DESCRIPTION

Figure 1A:
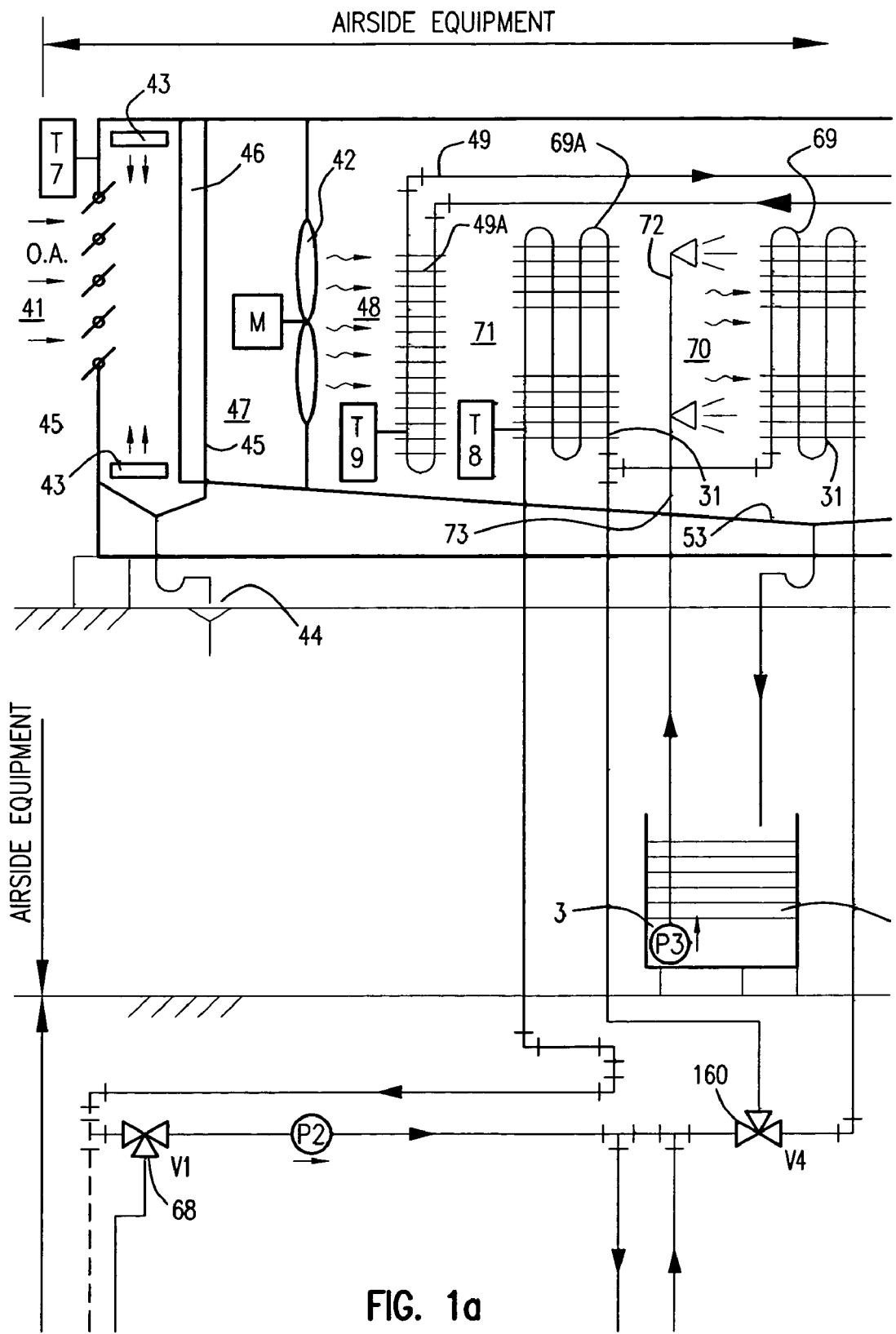
FIGS. 1g shows the apparatus for maximum work diagrammatically or schematically and FIGS. 1a–1f are enlarged views of portions FIG. 1g.
Figure 1B:
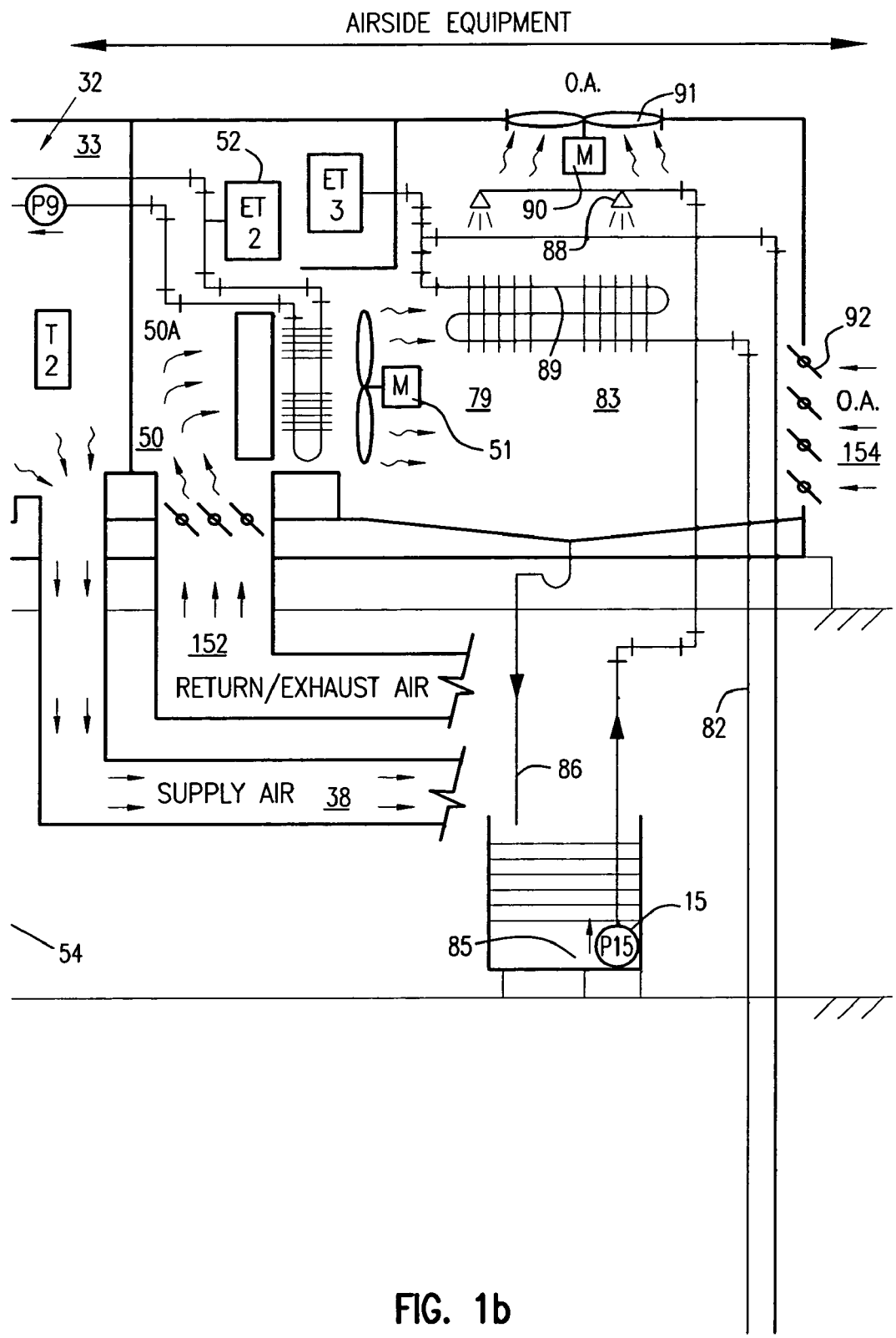
Figure 1C:
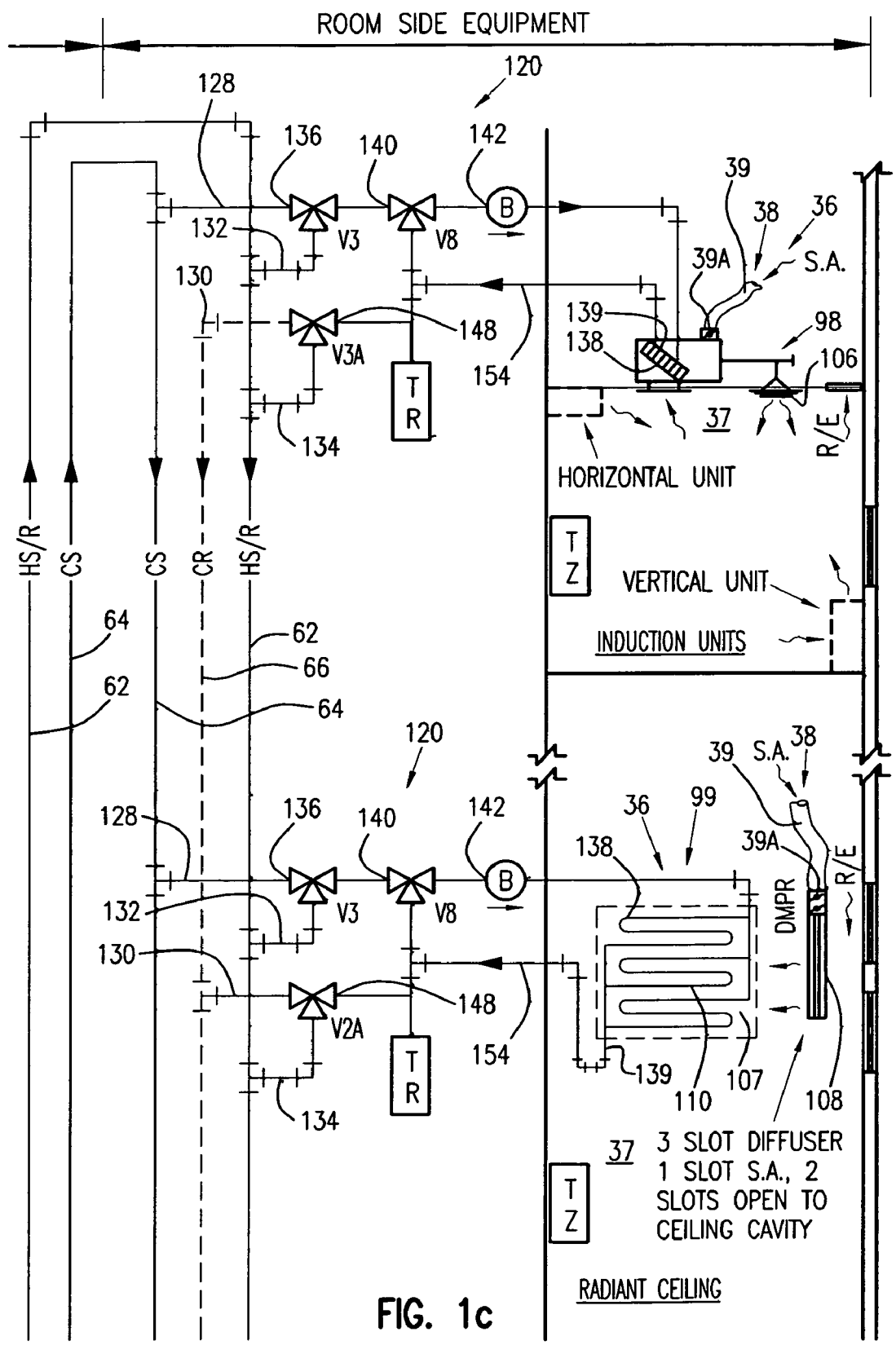
Figure 1D:
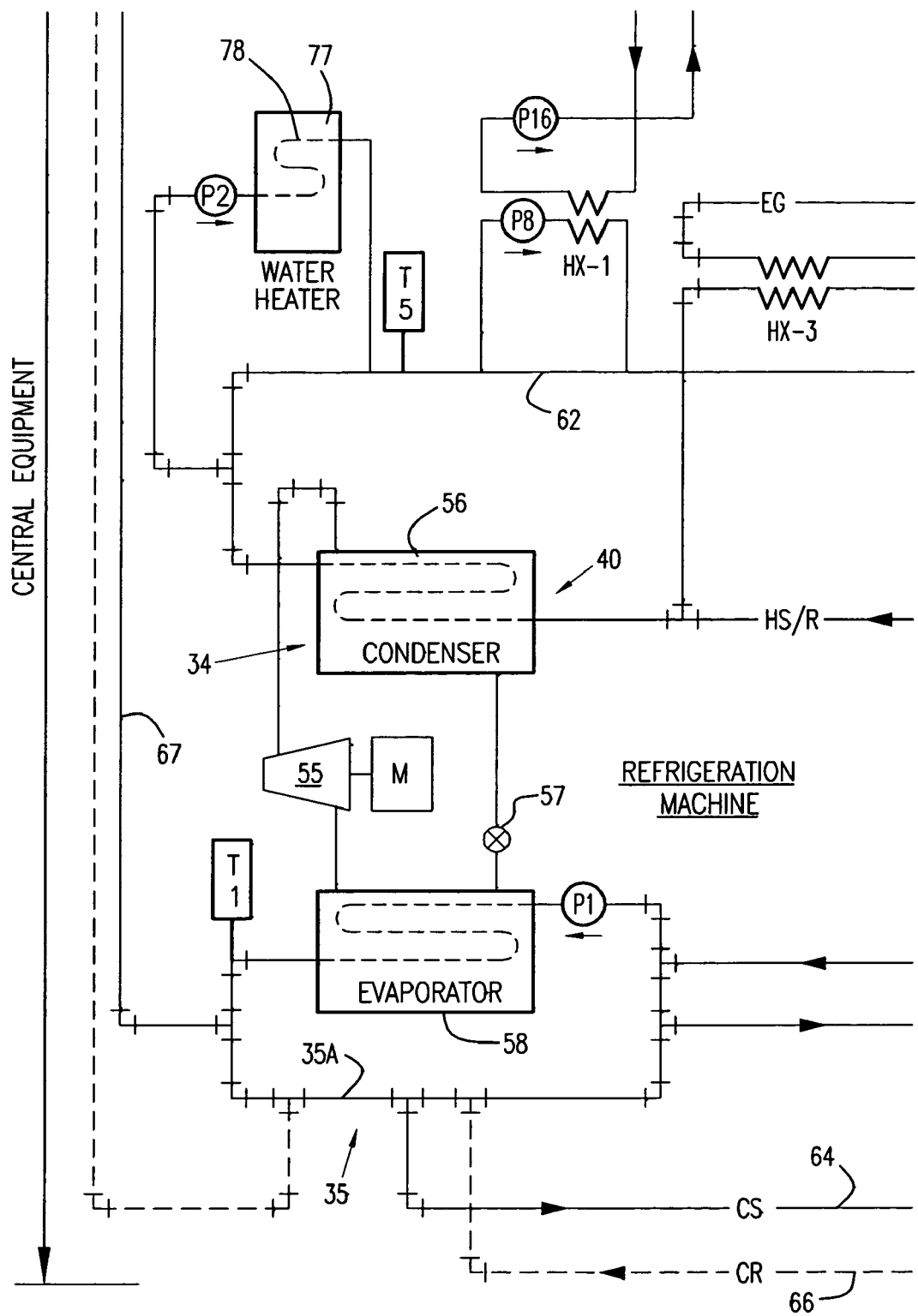
Figure 1E:
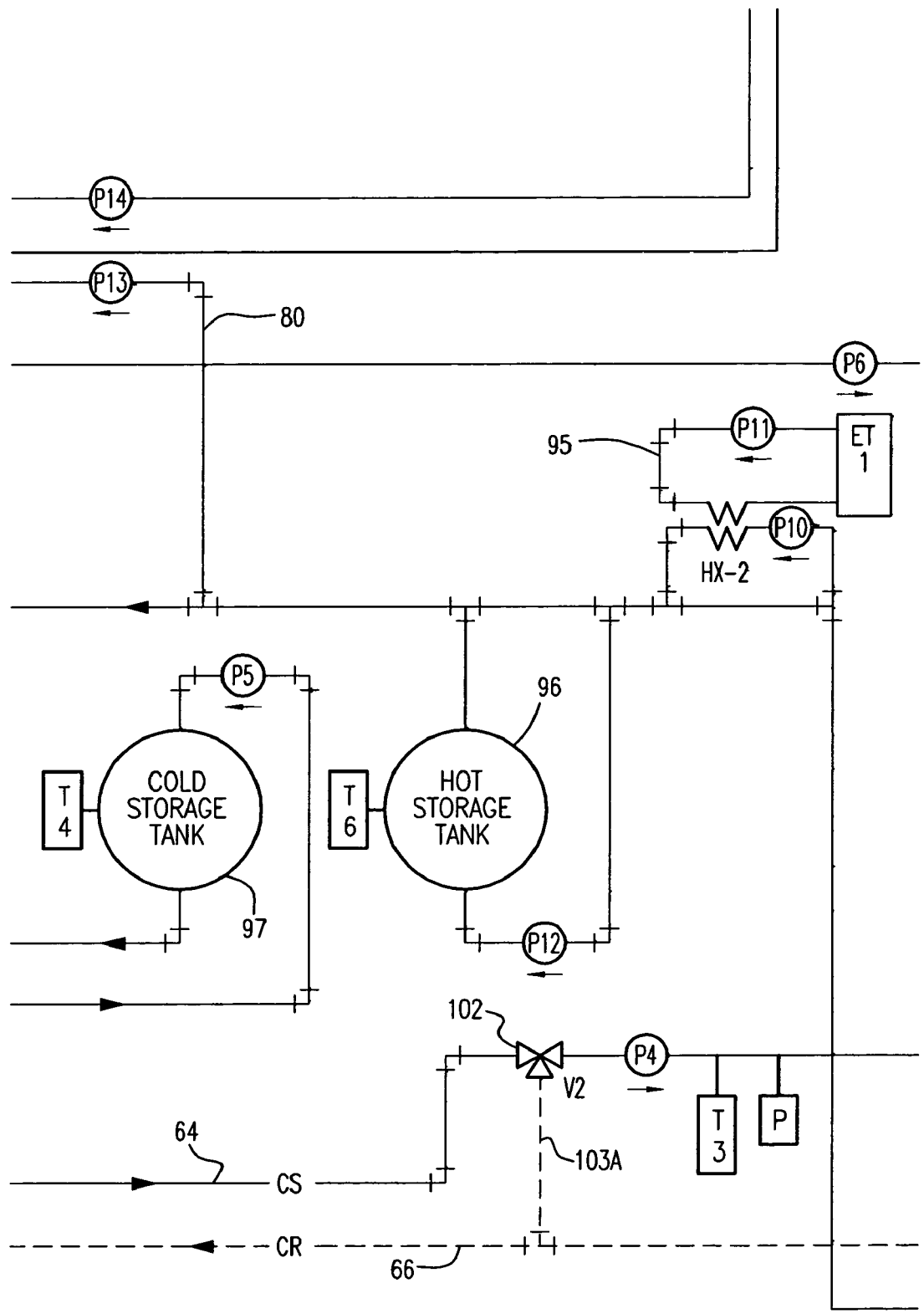
Figure 1F:
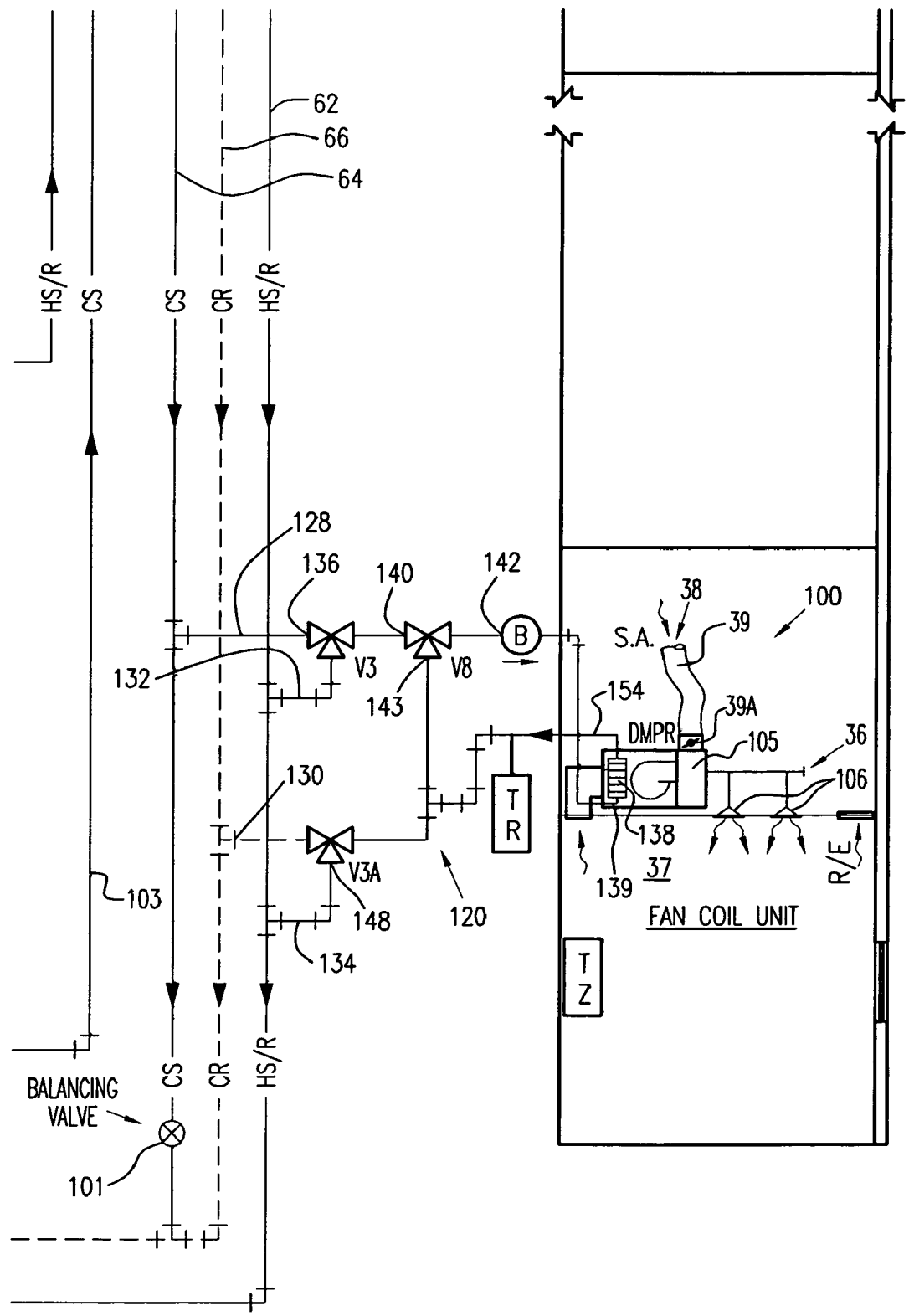
Figure 1G:
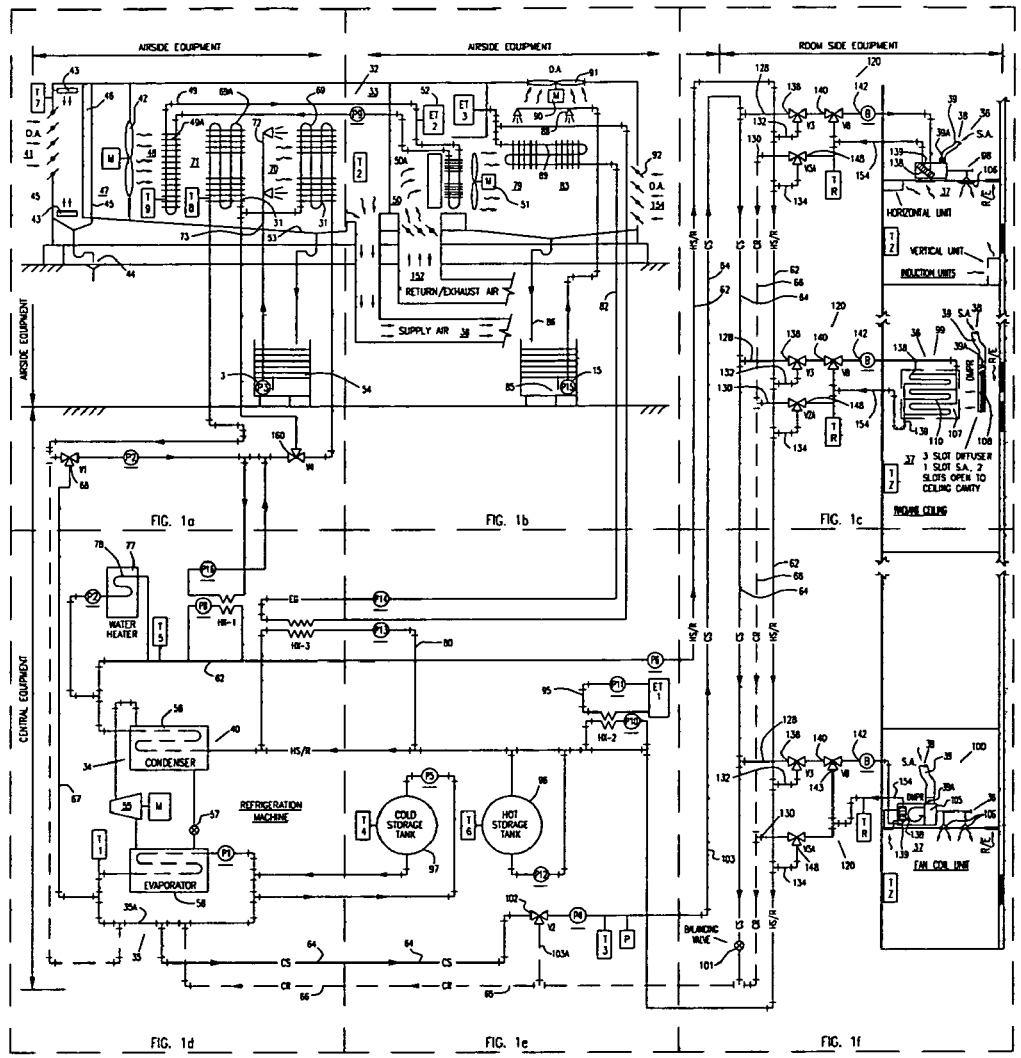

The present apparatus for maximum work or system 30 (hereinafter apparatus 30) is shown diagrammatically or schematically in FIG. 1g, and FIGS. 1a–1f show enlarged views of FIG. 1g. The apparatus 30 comprises a three-pipe system 59 for providing hot or cold water to room spaces or zones 37, and duct work 39 for delivering supply air (SA) 38 to the room spaces or zones 37. The apparatus 30 is used year round for heating and cooling and uses the same pipes for the summer cycle of operation and winter cycle of operation. The apparatus 30 may be used in the governmental buildings, offices, institutional, commercial and industrial buildings, schools, labs, factories, manufacturing plants, hospitals, apartments, enclosed spaces, and other structures where individual spaces or zones 37 require heating or cooling. The apparatus 30 provides for year-round space conditioning for all zones 37 independent of outside temperatures, ambient conditions, internal conditions, or solar conditions. The apparatus 30 also provides for temperature, humidity, and ventilation control. Means for control 200, to be described presently, control the various pumps, valves, fan motor units, and other parts of the apparatus 30. Additionally, no changeover cycles are needed and no changeover equipment is required to satisfy building loads, internal loads, and/or solar loads.

Supply Air

As shown in FIG. 1g, apparatus 30 comprises airside equipment 32 in an airside equipment room 33, central equipment 34 in a central equipment room 35, and roomside equipment 36 in rooms, spaces, or zones 37 to be conditioned. The apparatus for maximum work 30 comprises a refrigeration machine 40 located in the central equipment room 35. The refrigeration machine 40 provides a supply of hot and cold water to both the airside equipment 32 and to the roomside equipment 36. The airside equipment 32 works with the central equipment 34, in a manner to be described presently, so that supply air (SA) 38 exiting the airside equipment room 33, which is pumped through ducts 39 to the roomside zones or spaces 37, has about a 48° Fahrenheit dry bulb, wet bulb, and dew point temperature in the summer and winter, or in other words year round.

Figure 3:
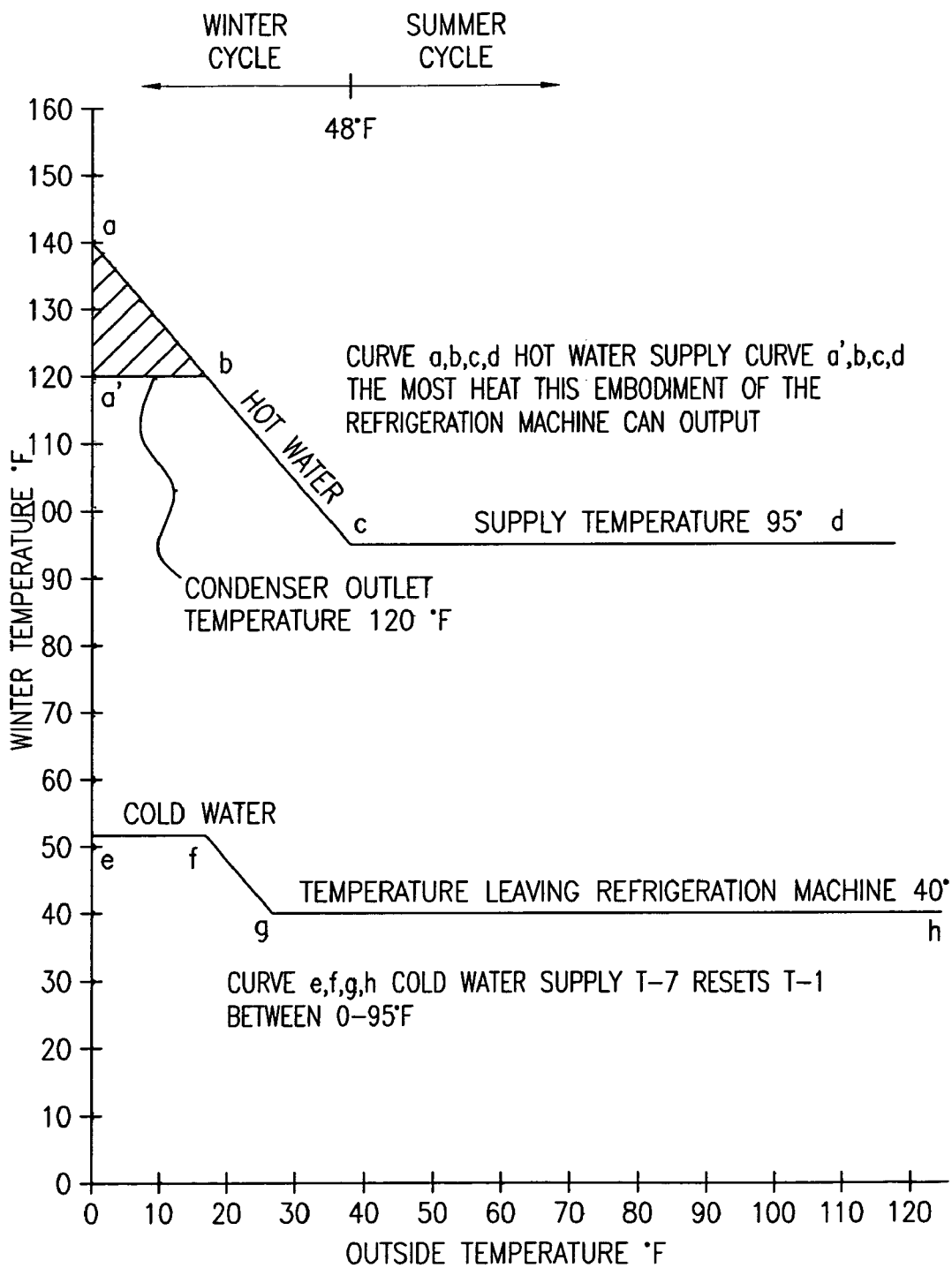
FIG. 3 is graph of the hot water supply and cold water supply temperatures produced by the refrigeration machine for the summer and winter cycles.

To achieve the above-described supply air 38 temperatures, outside air (OA), indicated by the arrow designated 41, is drawn into the airside equipment room 33. This incoming air needs to be conditioned and this is accomplished by employing a refrigeration machine 40 which provides hot and cold water and which serves as a heat sink in the summer and a heat source in the winter. First, apparatus 30 needs to determine whether it is the summer or winter, so that the refrigeration machine 40 can be properly controlled, that is so it can properly "ramp up" or "ramp down," as shown in FIG. 3, to handle the outside air 41 conditions.

To do this, an outside thermostat designated T7 senses the outside air 41 conditions, that is the air's dry and wet bulb temperatures and relative humidity. This information is then transmitted to the cold water supply from evaporator thermostat designated T1 in FIG. 1g, and to the hot water supply thermostat designated T5 in FIG. 1g. FIGS. 2a and 2b comprise a symbol list for the symbols used in FIG. 1. The hot water thermostat T5, upon receiving the signal, can then instruct the refrigeration machine 40 to "ramp up" if it is the winter and heat is needed. During "ramping up," shown in FIG. 3, the maximum water temperature available from the condenser may be about 120° Fahrenheit. But, by turning on a water heater or boiler 77, or other means for heating, the temperature of the hot water may be "ramped up" to about 140° Fahrenheit when the outside temperature is about 0° Fahrenheit, as shown in FIG. 3.

If on the other hand T7 sends a signal the outside temperature is hot, for example 95° Fahrenheit, then "ramping down" occurs, such that the refrigeration machine 40 delivers the cold supply water at about 40° Fahrenheit in the summer months. This is also shown in FIG. 3. Thus, the hot water thermostat T5 controls the refrigeration machine 40 so that the refrigeration machine 40 is either "ramps up" in the winter or "ramps down" in the summer. Thus the refrigeration machine 40 automatically supplies hot or cold water depending how it is instructed by the hot water thermostat T5.

It is noted at this point in connection with the above the means for control 200 is in electronic communication with the various pumps, valves, thermostats, refrigeration machine, fans, and other components of the apparatus 30. In an embodiment, the means for control 200 may comprise a direct digital control (DDC) system which schedules, monitors, and sequences all elements of the apparatus for maximum work 30, and displays and records all reports and information on its central control service computer 201. Direct digital control systems and use of such systems well know to those having ordinary skill in the art. The means for control 200 can quickly make adjustments to any of the above apparatus components so that supply air 38 having the above-described properties can be constantly maintained. Direct digital control systems are commercially available. The means for control 200 automatically controls the parts and components of the apparatus for maximum work 30. Thus, in an embodiment it is by a DDC system that the refrigeration machine 40 is controlled.

Turning now to incoming air outside air 41, the fan motor unit 42 draws outside air 41 into the central equipment room 33 through inlet vents 45. In the winter, any snow/ice that enters is melted by the radiant heaters 43. Melt water then flows to the drain 44. The incoming outside air 41 passes through the filter 46 and into the fan section 47, where it is blown through a runaround coil section 48.

Located in the runaround coil section 48 is a runaround coil loop 49 comprising a supply air coil 49A and a return/exhaust air coil 49B. The supply air coil 49A is also referred to as a supply air runaround preheating/precooling coil 49A, and the return/exhaust air coil 49B is also referred to as a return/exhaust (R/E) air runaround heating/cooling coil 49B. The runaround loop 49 is for preheating or precooling incoming outside air 41. The preheat/precool runaround coil loop 49 is filled with ethylene glycol or glycol formulation or other suitable fluid, and is pumped by the preheat/precool runaround coil loop variable frequency drive (hereinafter VFD) pump 9. VFD pumps known to those having ordinary skill in the art. The runaround coil loop VFD pump 9 pumps in both the summer and winter, that is, year round.

For example, in the winter, the incoming air may be 4° Fahrenheit. After the incoming air passes through the supply air runaround preheating/precooling coil 49A, its temperature may rise to about 45° Fahrenheit. The glycol that is in the supply air runaround preheating/precooling coil 49A is cooled in this process, but warm glycol is being pumped from the return/exhaust (R/E) air runaround heating/cooling coil 49B by the pump 9. Here, the return/exhaust fan motor unit 51 draws return/exhaust air 152 through filter 50A. The fan motor unit, designated 90, moves return/exhaust air 152 out of the evaporative cooler section 83 and out of the evaporative cooler 79. In this process, the warm return/ exhaust air 152 moves over the return/exhaust air runaround heating/cooling coil 49B, and the glycol held therein absorbs heat energy and is warmed. The warmed glycol is pumped back to the supply air runaround preheating/precooling coil 49A in the runaround coil section 48 of the airside equipment room 33 by the VFD pump 9. The incoming outside air 41 continues to be warmed. The runaround coil loop 49 is in fluid communication with a runaround coil expansion tank 52, which allows ethylene glycol in the runaround coil loop 49 to expand and contract as it is repeatedly heated and cooled.

As another example, the VFD pump 9 also pumps during the summer months. In the summer the outside air 41 may be, for example, 95° Fahrenheit, while the return/exhaust air 152 in the R/E section 50 may be about 75° Fahrenheit. Here, the glycol in the supply air runaround preheating/precooling coil 49A serves to cool the incoming outside air 41, by absorbing heat energy from the air. The warmed glycol is pumped by VFD pump 9 through the return/exhaust (R/E) runaround heating/cooling coil 49B in the return/exhaust section 50. Here exiting return air, which is at about 75° Fahrenheit, passes through the return/exhaust (R/E) runaround heating/cooling coil 49B thus cooling the heated ethylene glycol that absorbed heat from incoming outside air 41. Thus, as the VFD pump 9 continues pumping, the incoming hot air is cooled by the cool glycol in the supply air runaround preheating/precooling coil 49A. Then the warmed glycol is pumped back to the return/exhaust section 50 and through the return/exhaust air runaround heating/cooling coil 49B where the heat is transferring to the return/exhaust air 152. It is noted that the floor 53 of the airside equipment room 33 is sloped, so that any condensation that might flow off the coil 49 flows into sump 54. This completes the first step in conditioning either hot or cold incoming air.

Next, the airside equipment 32 is used to generate and deliver supply air 38 at about a 48° Fahrenheit wet bulb, dry bulb, and dew point temperature during the summer months and during the winter months. As will be described presently in connection with a three-pipe system 59 used for heating and cooling the roomside spaces or zones 37, supply air 38 having the above-described properties during the summer and winter months will not cause condensation to form on the roomside coils 138. This removes the need for pans to catch condensation water. In order to provide the supply air 38, however, there are two possible scenarios, one for the summer and one for the winter.

In the summer at high cooling, the incoming outside air 41 may be at a 95° Fahrenheit dry bulb temperature, and a 75° Fahrenheit wet bulb temperature. This air must be cooled and brought to the proper humidity level before it can be sent through the ducts 39 to the room spaces or zones 37. It is noted at this point that the room spaces or zones 37 may comprise rooms, spaces, zones, areas, buildings, portions of buildings, structures, or any other enclosed region or area.

The refrigeration machine 40 comprises a compressor motor unit 55, a condenser 56, an expansion valve 57, an evaporator 58, and a refrigerant. The refrigeration machine 40 serves as both a heat source and a heat sink. When the motor compressor unit 55 is activated, it draws in the gaseous refrigerant vapor drawn in the evaporator, and compress the vapor. Heat is generated as a byproduct of the gas compression process. A high pressure hot gas exits the compressor 55 and enters the condenser 56. The condenser 56 serves as a heat source for the apparatus for maximum work 30, and this heat energy is absorbed from the condenser by the hot supply/return (HS/R) pipe 62 that passes through the condenser 56. After the refrigerant is condensed in the condenser 56, hot liquid flows through the expansion valve 57, and into the evaporator 58. The evaporator 58 thus serves as a cold source or heat sink through which the evaporator primary loop 35A passes.

The hot water supply thermostat, indicated by reference number T5, detects the temperature of the hot water exiting the condenser 56, and maintains a hot water supply of about 95° Fahrenheit in the summer, and a hot water supply of about 120° Fahrenheit in the winter (as shown in FIG. 3). The hot water supply thermostat T5 is in electronic communication with the outside air thermostat designated T7 and the airside supply thermostat T2, so that it can determine if heating or cooling is required and thus control the refrigeration machine 40 accordingly. It is noted in FIG. 3 that during the winter months extra heat may be added by a water heater, for example a boiler 78, if demand for hot water is high. As shown in FIG. 3, when the summer comes the temperature of the hot supply water ramps down because there is less demand for hot water.

The cold supply (CS) pipe 64 passes through the evaporator 58 and is thus cooled in the process. The temperature of the cold supply water exiting the evaporator 58 is sensed by the cold water supply thermostat designated T1. T1 maintains the temperature of the water exiting the evaporator 58, so that during the summer months the temperature of the cold water ramps down from about 52° Fahrenheit (winter time cold water supply temperature) to about 40° Fahrenheit during the warm weather months, as shown in FIG. 3.

Returning to the airside equipment room 33 during summer conditions, cold water from the evaporator 58 is pumped through the evaporator primary water loop 35A. Runout pipe 67 taps into the evaporator primary water loop 35A and delivers cold water to the modulating three way mixing valve 68 (designated V1 in FIG. 1g) by the airside pump 2, which is downstream of the modulating three way mixing valve 68. The cold water, which may be about 40° Fahrenheit since it is the summer, is pumped by the airside pump 2 through the two position three way diverting valve 160 (designated V4 in FIG. 1g) which is fully opened for the flow of cold water, and through an airside equipment coil 31. The airside equipment coil 31 comprises a sprayed cooling coil 69 (rows 1–4 of the airside equipment coil 31 as shown in FIG. 1g) and further comprises a reheat/recooling coil 69A (rows 5–8 of the airside equipment coil 31 as shown in FIG. 1g). In other embodiments, all of the coils described and shown herein may have fewer or more rows than shown in FIG. 1g.

It is noted that because this is the summer cooling cycle, the sprayed coil humidification heat source heat exchanger, designated HX-1 in FIG. 1g, does not have any water pumped through it, as heat does not need to be added to the airside equipment room 33. As will be described presently, HX-1 will come into play in connection with the description of winter mode of operation.

Continuing with the summer condition, the cold water flows through the sprayed cooling coil 69 in the sprayed cooling coil section 70, and it flows through the reheat/recooling coil 69A (rows 5–8 of the airside equipment coil 31) in the cooling coil section 71. As previously described, incoming outside air 41 first flows through the supply air coil 49A in the runaround coil section 48, then through the reheat/recooling coil 69A in the cooling coil section 71, and then through the sprayed cooling coil 69 in the sprayed cooling coil section 70, where the air is both cooled and brought to the desired wet bulb, dry bulb, and dew point temperature. The cooling coil spray pump 3 is a VFD pump and pumps water through pipe 73, which is at about 48° Fahrenheit, through one or more nozzles 72, and onto the sprayed cooling coil 69. The sprayed water drains down and collects in the tank 54 where the VFD cooling coil spray pump 3 is located. In particular, the incoming air is conditioned until it is at about a 48° Fahrenheit dry bulb, wet bulb, and dew point temperature, and has a relative humidity of 100%. To achieve this state, the airside supply air thermostat, designated T2 in FIG. 1g, is set at a 48° Fahrenheit dry bulb temperature and wet bulb temperature year round. This supply air (SA) 38 is then pumped though the ducts 39 to the roomside equipment 36. As for the water in the reheat/recooling coil 69A, it exits the airside equipment room 33 at about 52° Fahrenheit, and returns to the evaporator primary water loop 35A. From there it may be pumped through the evaporator 58, the pipe 67, and through the modulating three way mixing valve 68, and the cooling cycle repeats.

Turning now to the conditions during the winter months. The incoming outside air 41 may be at about 0° Fahrenheit. This incoming outside air 41 is first warmed as it passes through the runaround coil section 48. Here, the ethylene glycol in the supply air runaround preheat/precooling coil 49A adds heat to the outside air 41 so that its temperature is raised to about 45° Fahrenheit. The return/exhaust air runaround heating/cooling coil 49B absorbs heat from the return/exhaust air 152 in the return/exhaust section 50. This heat is delivered to warm incoming outside air 41. This increases energy savings because the incoming outside air 41 is heated with energy from return/exhaust air 152.

Next, this air 41 must be warmed and brought to the appropriate humidity level, and this is done in the reheat/recooling coil section 71. It is noted that in the winter condition, there is no flow of water from the evaporator 58 through pipe 67 to the modulating three way mixing valve 68, and there is no flow of water from the reheat/recooling coil 69A back to the evaporator 58. In particular, the modulating three way mixing valve 68 is closed to flow from the evaporator 58 and there is likewise no return flow to the evaporator 58. Additionally, the two position three way diverting valve 160 designated V4 is closed to the flow of water to the sprayed airside cooling coil 69 (rows 1–4 of the airside equipment coil 31). Thus, the water in the sprayed cooling coil 69 just stays there and does not flow in the winter.

During the heating mode water is pumped by the airside cooling coil pump 2. Water is also pumped by the secondary heating loop pump 16 through the humidification heat source heat exchanger, designated HX-1. Here, the water is warmed in HX-1 and it is noted the source of the heat in HX-1 is from water from the condenser 56 pumped by the HX-1 VFD pump 8 through HX-1, as shown. The two position three way diverting valve 160 is open so that warm water pumped by cold water supply to airside equipment pump 2 and the HX-1 secondary loop pump 16 flows through the reheat/recooling coil 69A only. Thus, the warm water is pumped through the cooling coil section 71 in the winter condition. After passing through the reheat/recooling coil 69A, the temperature of the air may be about 75° Fahrenheit. However, this winter air is dry and needs to be humidified. Thus, the air then moves through the sprayed coil section 70 where it is sprayed with water and brought to the desired wet bulb and dry bulb condition in an adiabatic process.

In connection with the above and in a manner more fully described below, in the winter the airside supply air thermostat designated T2, the runaround thermostat designated T9 in FIG. 1g, the reheat/recooling coil thermostat designated T8, the variable frequency drive pump 9, and other components are controlled by the means for control 200 and operate in concert to deliver supply air at about a 48° Fahrenheit dry bulb and wet bulb temperature and a relative humidity of about 100%. This supply air 38 is moved through ducts 39 to the roomside spaces or zones 37.

The supply air 38 thus generated in both the summer and winter months may then be used in structures, hospital, schools, institutions, government owned buildings, apartments, offices, or homes, medical centers, research labs, zones, areas, and any enclosed space.

Three Pipe System

The above described supply air 38 is used in combination with a three pipe system 59 so that the air in the rooms or zones 37 may be cooled or heated. In particular, three pipe water circuits 120 and roomside equipment 36 provide for year round conditioning of zones and spaces 37. Leading from and back to the refrigeration machine 40 condenser 56 is the hot supply/return piping loop (HS/R) 62 or hot supply return pipe 62, leading from the evaporator 58 primary loop 35A is the cold supply pipe 64, and leading back to the refrigeration machine 40 is the cold return pipe 66, thus a three-pipe system 59. The majority of the time, the refrigeration machine 40 condenser 56 and evaporator 58 can provide all the heating and cooling needed by the apparatus for maximum work 30.

The three pipe system 59 delivers hot and cold water to the roomside equipment 36. The water in the hot supply/return pipe (HS/R) 62 is pumped by the hot water combination supply return pump 6 to the roomside equipment 36 through the hot supply/return piping loop 62. After being piped to the roomside equipment 36 the hot supply/return water is piped to a the hot storage tank 96 and pumped into the hot storage tank 96 by the hot water storage tank bypass pump 12. Here, the hot supply/return water is stored, and the hot water supply thermostat designated T6 in FIG. 1g senses the temperature of the hot water. When there is a need for heating the water in the hot storage tank 96 may be pumped into the condenser 56.

The cold supply pipe 64 taps into the evaporator primary loop 35A, and cold water is pumped by the cold water supply to roomside equipment pump 4 through the cold supply pipe 64 from the modulating three way mixing valve 102 (designated V2 in FIG. 1g). The roomside equipment pump 4 is a variable frequency drive pump (VFD) controlled by the discharge pressure controller designated P in FIG. 1g. One port of the modulating three way mixing valve 102 connects to the cold supply pipe 64. The cold supply water being delivered may be about 40°–48° Fahrenheit in the summer and about 52° Fahrenheit in the winter. The other port connects to a pipe 103A that connects to the cold return pipe 66. The pipe 103A delivers water at about 64° Fahrenheit to the modulating three way mixing valve 102 in the summer months.

The modulating three way mixing valve 102 is under the control of the cold water supply to roomside equipment thermostat designated T3, which detects the temperature of water exiting the cold water supply to roomside pump 4. T3 maintains a 52° Fahrenheit water temperature being pumped to the cold supply pipe 64 leading to the water blending circuits 120, because it blends the cold supply water and cold return water from pipe 103A during the summer months to achieve that temperature. But, in the winter months, the modulating three way mixing valve 102 closes to the flow of water through the pipe 103A, and 52° Fahrenheit is delivered to the blending circuit 120 directly from the evaporator 58. Thus, the cold water delivered to the blending circuits 120 is 52° Fahrenheit year round.

After passing through the modulating three way mixing valve 102, the cold water is pumped through the roomside cold water loop 103 by the cold water supply to roomside loop pump 4. As shown in FIG. 1g, the system expansion tank 104 allows for expansion and contraction of the hot and cold water in the hot supply/return pipe 62 and cold supply pipe 64. Additionally, a balancing valve 101 is provided at the end of the cold supply (CS) pipe 64. The purpose of the balancing valve is to bleed, for example 1% of the cold water flow through cold supply pipe (CS) 64, so that the water in the cold supply pipe (CS) 64, which will slowly absorb heat from its surroundings, is constantly replenished with cold supply water.

Turning now to the heating and cooling of the room spaces or zones 37, the roomside equipment 36 comprises a water blending circuit 120. The roomside equipment further comprises an induction unit 98; a radiant ceiling 99; and a fan coil unit 100. The roomside equipment 36 heats or cools the zone or roomspace 37 in which it is deployed. Thus, the apparatus 30 is capable of heating or cooling the spaces or zones 37 twelve months a year.

As shown in FIG. 1g, each induction unit 98, radiant ceiling 99, and fan coil unit 100 works with an identical water blending circuit 120. Each induction unit 98, radiant ceiling unit 99, and fan coil unit 100 also has a ventilation duct 39 connected to the airside equipment room 33, the duct 39 for delivering supply air 38 to the zone or roomspace 37. The ducts 39 are equipped with two-position dampers 39A to regulate air flow.

The water blending circuits 120 used with the induction unit 98, the radiant ceiling 99, and the fan coil unit 100 are the same. Common reference numbers are used throughout the description of the water blending circuits 120. A cold supply runout pipe 128 connects to the cold supply pipe 64. A cold return runout pipe 130 connects to the cold return pipe 66. A hot supply runout pipe 132 and hot return runout pipe 134 connect to the hot supply/return pipe 62, as shown in FIG. 1g.

The cold supply runout 128 and hot supply runout 132 connect to the two ports of an upstream two position three way changeover valve 136 (designated V3 in FIG. 1g), that allows either hot or cold water to flow to there-through and to the modulating three way zone blending valve 140 (designated VB in FIG. 1). The outlet of the modulating three way valve zone blending valve 140 connects to a blending pump 142. The blending pump 142 pumps water to the coil inlet, and through the roomside equipment coil 138. The roomside equipment coil 138 connects to the coil return pipe 154. The coil return pipe 154 connects to the zone blending valve VB and to a downstream two position three way changeover valve 148 indicated by V3A. As shown, a roomside equipment coil 138 is found or used in each of the induction unit 98, radiant ceiling 99, and the fan coil unit 100.

The roomside zones or spaces 37 comprise a roomside zone thermostat designated TZ in FIG. 1. The roomside zone thermostat TZ is for sensing the temperature of the air in the room space or zone 37. The other thermostat is a roomside fluid return thermostat designated TR in FIG. 1g, which senses the temperature of the coil return water that is returning from the roomside equipment coil 138. Electronic signals are sent from the roomside zone thermostat TZ indicating what the room temperature is to be maintained or if a change in room temperature is needed (heating or cooling).

The return water thermostat TR, because it senses the temperature of the coil return water, can control the modulating three way zone blending valve 140 to behave a plurality of different ways. For example, the modulating three way zone blending valve 140 may direct all the return water flowing from the coil outlet 139 to flow to the second inlet port 143 of the modulating three way zone blending valve 140, and be pumped again through the roomside equipment coil 138. Additionally, the modulating three way zone blending valve 140 may allow all the return water flowing from the coil outlet 139 to flow to the cold return pipe (CR) 66, or to the hot supply/return pipe (HS/R) 62, or any percentage of flow as directed by the return thermostat designated TR. Thus, energy savings may be achieved because the return water may be recirculated through the equipment coil 138 until the return water has either absorbed heat from the room or space 37, or has delivered its heat to the room or space 37. In the summer months the cold water enters the blending circuit 120 at about 52° Fahrenheit and is returned to the cold return pipe at about at 64° Fahrenheit. From there it is piped to the modulating three way mixing valve 102 and evaporator 58 as previously described. In the winter months, the hot water is returned to the hot supply/return pipe 62 at about 85° Fahrenheit and from there it is pumped back to the condenser 56.

It is noted that when there is no demand for cooling or heating the zone thermostat TZ drives the modulating three way valve 140 to full bypass position and de-energizes the blending pump 142.

Turning now to the structure of the induction unit 98, radiant coil unit 99, and fan coil unit 100, it is noted that these devices are standard in the heating and cooling industry and are known to those having skill in the art. The fan coil unit 100 comprises an inlet duct 39 with dampers 39A that allows supply air 38 (described previously) to be introduced into the fan coil unit 100. The unit 100 comprises a fan 105, a roomside equipment coil 138, room air vents 106 for delivering air to the space or zone 37, and the zone thermostat designated TZ. The supply air 38 enters through the duct 39 and damper 39A and is blown into the space or zone 37. If, for example, the space or zone 37 requires rapid cooling, the roomside zone thermostat TZ is set to the desired temperature. Then, a signal is sent to the return water thermostat TR, and the return water thermostat TR instructs the modulating three way zone blending valve 140 to open to cold flow only, and the blending pump 142 pump pumps cold water through the coil 138. The modulating three way zone blending valve 140 closes to the flow of coil return water and the coil return water is sent through the downstream two position changeover three way valve 148. The water is then directed back to the cold return pipe (CR) 66. The space or zone 37 may thus be rapidly cooled.

However, if the space or zone 37 is already relatively cool, all or a percentage of the cold water in the coil 138 may be recirculated though the coil 138, allowing the water to absorb more heat energy before moving out through the downstream two position three way valve 148 and to the cold return pipe (CR) 66. In this situation, the return water thermostat TR instructs the modulating three way valve 140 so that there is either complete recirculation of the coil water through the coil 138 or any percentage thereof. When the room or zone 37 reaches a predetermined temperature, the modulating three way valve 140 may allow more cold water to enter from the cold supply pipe 64. This variable flow to the cold return pipe (CR) 66 results in the cold supply pipe (CS) 64 and hot supply/return pipe (HS/R) 62 to be variable flow and constant return temperature. The temperature rise of the cold water at design is 40° Fahrenheit to 640 Fahrenheit, or a 24° Fahrenheit rise. This results in a water flow of about 1.0 GPM(gallons per minute)/ton. This variable flow diminishes the energy required by the cold water pump 4. The constant return water temperature to the evaporator 58 diminishes the energy required by the motor compressor 55. The arrangement of the above-described blending circuit 120 is an energy saving component of this invention. This blending circuit 120 provides the owner with a minimum energy input into the apparatus 30 for maximum work output.

If, on the other hand, the room space or zone 37 needs immediate heating, the room thermostat TZ sends a signal to the water return thermostat TR, which instructs the upstream two position three way valve 136 to open to the flow of hot water. The modulating three way valve 140 opens so that hot water is pumped by the blending pump 142 through the coil 138. Supply air 38 delivered to the room air vents 106, and the room or zone 37 is heated. The room 210 is heated. When the room thermostat TZ temperature setting is reached, a signal is sent to the return water thermostat TR, which instructs the modulating three way valve 140. The modulating three way valve 140 may then allow a portion or all of the coil water to be recirculated through the coil 138. When the room temperature drops, the room thermostat TZ sends an electronic signal to the return thermostat TR, which directs the modulating three way valve 140 to open and allow the flow of hot water to the blending pump 142. Hot water is then pumped through the coil 138, and the vents 106 blows the warmed air into the room space or zone 37.

The water blending circuit 120 is the same for the radiant ceiling 99 unit. Supply air 38 is blown through the duct 39 and damper 39A, and into a three slot diffuser 108. One slot is for supply air 38 and two slots open to the ceiling cavity 110. The air is then blown across the ceiling 107. The radiant ceiling 99 comprises a roomside equipment coil 138, and the coil 138 is either heated or cooled in the manner described above.

The water blending circuit 120 is the same for the induction unit 98. As shown, the supply air 38 passes through damper 39A and flows out of the duct 39. In the process the incoming supply air 39 air stream draws room air through the coil 138. The room air is thus heated or cooled. The air is blown into the zone or room 37 and passes through the vents 106. As shown in FIG. 1g, the room may be embodied so that the induction unit 98 is arranged horizontally or vertically therein.

Although FIG. 1g shows a single induction unit 98, a single radiant coil unit 99, and a single fan coil unit 100, the zoning arrangement may be embodied so that a group of induction units 98, radiant coil units 99, and/or fan coils 100 be utilized in a single air conditioned zone.

The cold water, after having been pumped through the roomside equipment 36, is piped to the cold water storage tank 97 through the cold return pipe 66 into the cold water storage tank 97 by the cold water storage bypass pump 5. The cold water thermostat designated T4 in FIG. 1g senses the temperature of the cold water in the tank 97. When there is a need for extra or quick cooling of the cold supply water (CS), the cold water in the storage tank 97 is pumped to the evaporator 58 by the cold water storage bypass pump 5. Hence the stored cold water may be used when cooling demands rise. Such use of a cold water storage tank 97 may allow a smaller refrigeration machine 40 to be used in a particular application. A feasibility study may be generated to determine cold water storage tank 97 size and refrigeration machine 40 size for optimum cost and optimal energy efficiency and consumption. This feasibility study also comprises such factors as cooling/heating duty required, energy cost (demand and use charges, time of day rates etc.) and any space constraints associated with the hot and cold storage tanks 96,97, respectively. Feasibility studies and the manner of carrying out such studies are well known to those having ordinary skill in the art.

Figure 4A:
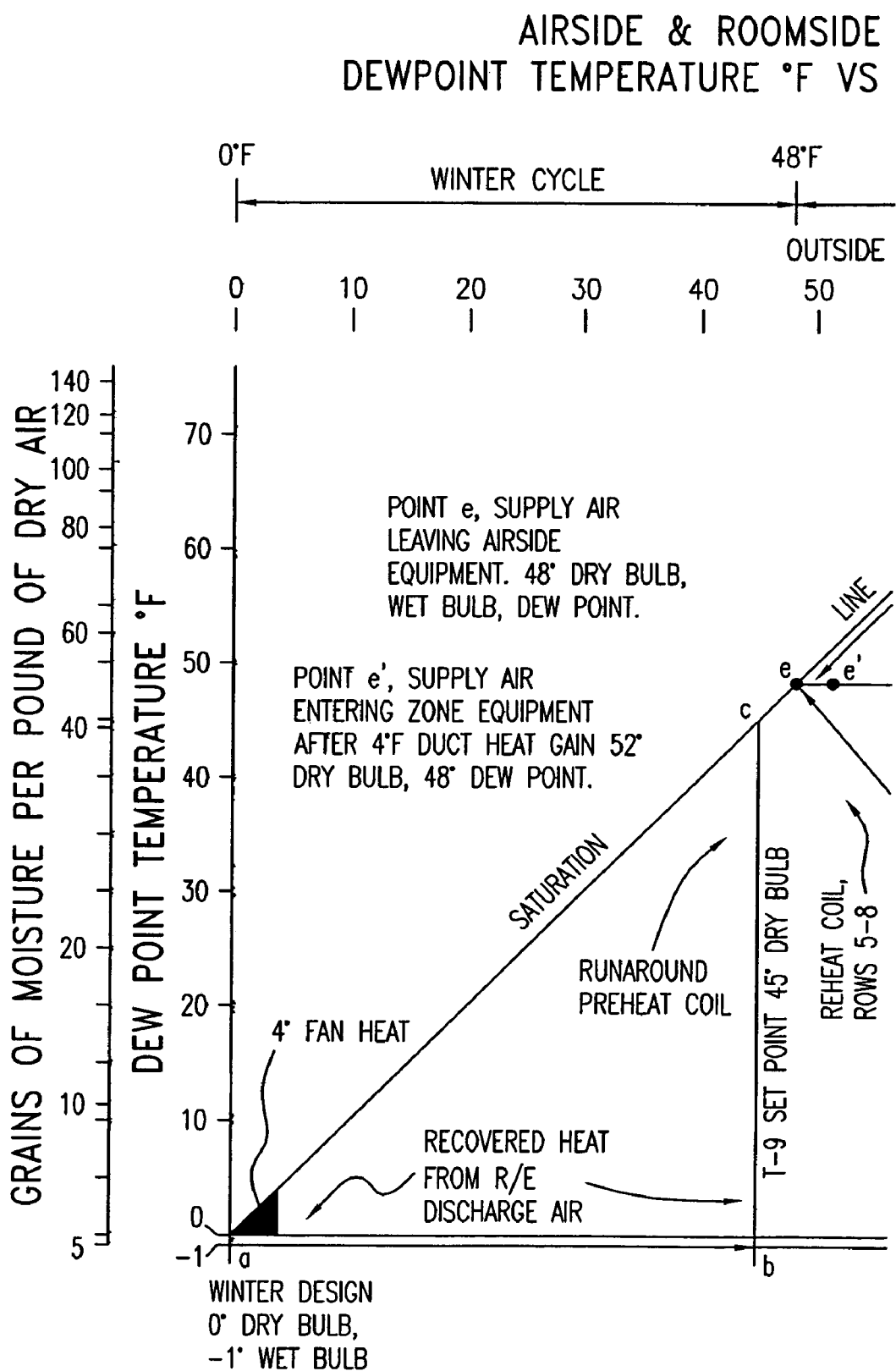
FIGS. 4a, 4b are a graphical representation showing the design conditions, the airside conditions in the winter and summer cycles, and the roomside conditions.
Figure 4B:
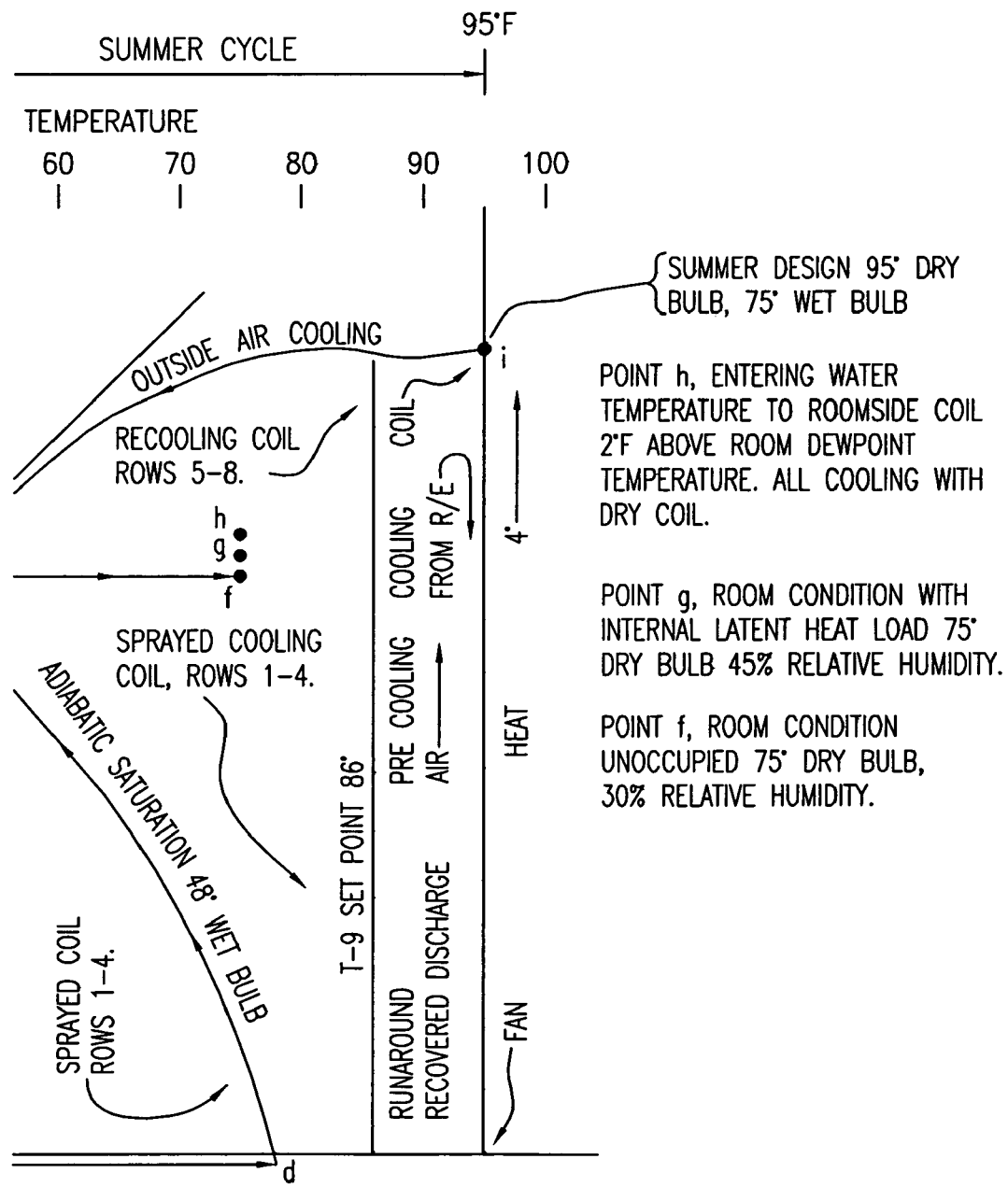
Figure 4C:
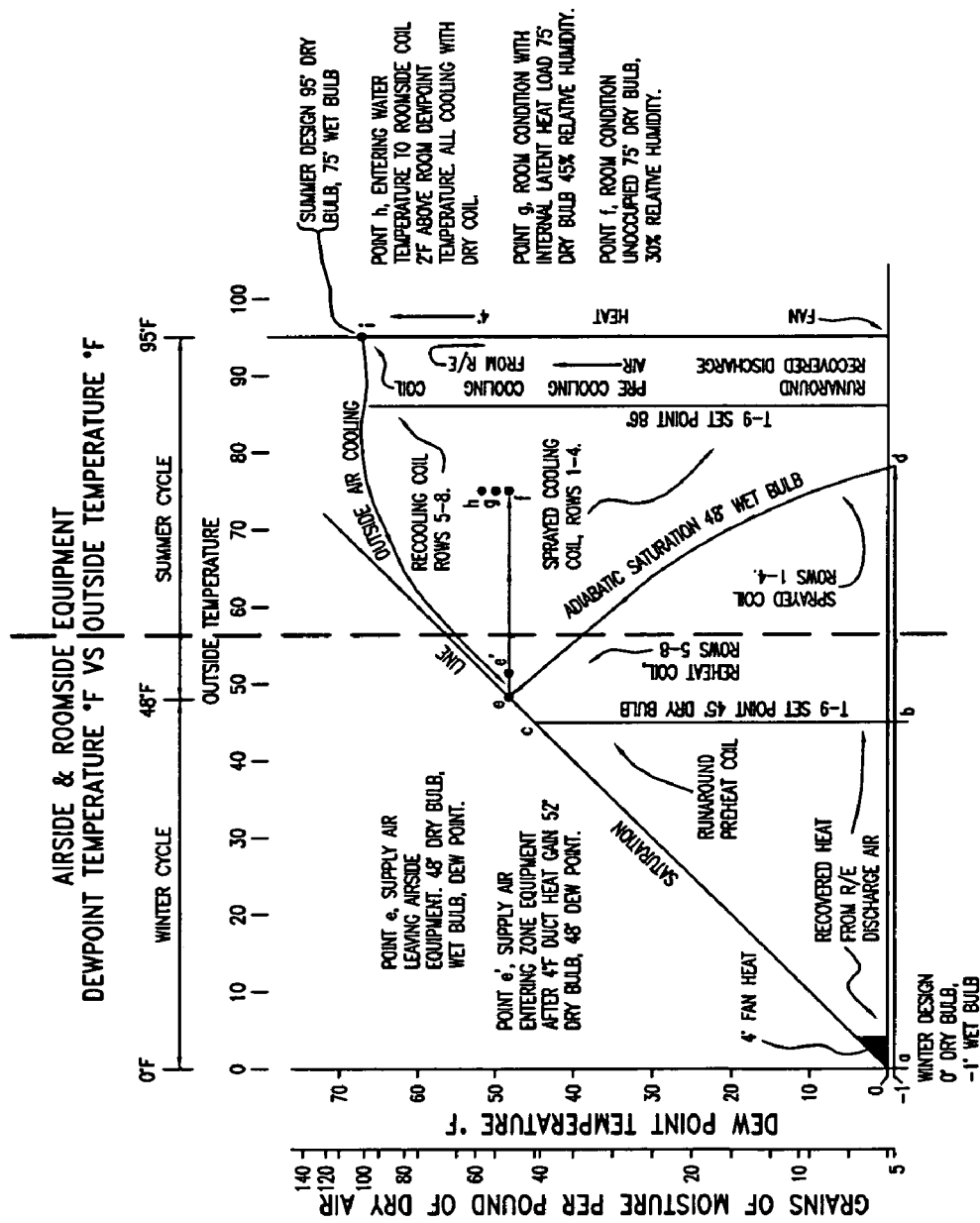
FIG. 4c shows FIGS. 4a and 4b as one figure.

FIGS. 4a, 4b, and 4c—A Graphical Representation of: the Design Conditions, the Airside Conditions in the Winter Cycle and Summer Cycle, and the Roomside Conditions FIGS. 4a and 4b show a graphical representation of the summer and winter cycles and the airside and roomside conditions, and FIG. 4c shows FIGS. 4a and 4b as one figure. FIG. 4c is viewed in connection with the above description, and shows a graphical representation of dewpoint temperature (ordinate) in degrees Fahrenheit plotted against the outside air temperature in degrees Fahrenheit (abscissa). It also shows the grains of moisture per pound of dry air and the increase in grains as temperature rises.

Design Conditions

The graph shown in FIG. 4c illustrates an embodiment of the operation of the apparatus 30 at the following design parameters for the winter and summer. In particular, in the winter the design conditions are for a 0° Fahrenheit dry bulb temperature and about a −1° Fahrenheit wet bulb temperature, and humidity ratio of 3.4 grains/pound of dry air (point a in FIG. 4c). The summer design conditions are for a 95° Fahrenheit dry bulb temperature, a 75° Fahrenheit wet bulb temperature, and a humidity ratio of about 100 grains/pound of dry air (point i in FIG. 4). In this embodiment, the design is for a maximum occupancy load of seven (7) people/1000 square feet, and outdoor air ventilation of 20 cubic feet a minute/person. The indoor design conditions for the zones or spaces 37 are for a 75° Fahrenheit dry bulb temperature and about 30% to 45% relative humidity year round. These design conditions are suitable for offices. However, in other embodiments of the apparatus for maximum work 30, these design parameters may be readily changed to satisfy the particular needs of hospitals, schools, laboratories, factories, and other enclosed spaces or zones 37.

Airside Conditions Winter Cycle Heating and Humidification

1. As shown in the graph of FIG. 4c, in the winter cycle there is both heating and humidification of the incoming outside air 41. The outside air 41 temperature may be between about 0° Fahrenheit to about 48° Fahrenheit, and the fan motor unit 42 adds another 4° Fahrenheit to the incoming outside air 41.

2. When the outside air 41 temperature is between 4° Fahrenheit to 45° Fahrenheit, the supply air runaround preheating/precooling coil 49A, the return/exhaust air runaround heating/cooling coil 49B, VFD pump 9, T7, and T9 operate in concert to maintain 45° Fahrenheit dry bulb runaround preheat coil 49A discharge temperature.

3. When the outside air 41 is 45° Fahrenheit to 48° Fahrenheit, T7, T8, T2, VFD pump 8, pump 16, V4, rows 5–8 of the reheat coil 69A, V1, pump 2, and VFD pump 3 operate in concert to provide adiabatic saturation at 48° Fahrenheit wet bulb temperature to a final condition of 48° Fahrenheit dry bulb, wet bulb, and dew point. The supply air 38 duct heat gain of 4° Fahrenheit reheats the supply air 38 to 52° Fahrenheit dry bulb and 480 dew point temperature.

4. During low outside air 41 temperatures items 1, 2, and 3 above occur simultaneously, and then as the outside air temperature 41 rises items 1 and 3 occur simultaneously. All of this being controlled by the means for control 200.

Also, in the winter cycle the air exits the reheat/recooling coil 69A at about 75° Fahrenheit shown in FIG. 4c by line a, b, d. This warm air needs be humidified, and this is accomplished by the winter humidification cycle. This is shown as the area under the adiabatic saturation curve in FIG. 4c (curve d–e). Point e shows the supply air (SA) 38 leaving the airside equipment at a 48° Fahrenheit dry bulb temperature, wet bulb temperature, and dew point temperature. Continuing with FIG. 4c, point $e^1$ shows the supply air (SA) 38 that is distributed to the zones or spaces 37. As shown, the air is at about 52° Fahrenheit dry bulb temperature and a 48° Fahrenheit wet bulb temperature. The 4° Fahrenheit heat gain is due to heat gain as the supply air 38 air moves through the ducts 39. The apparatus for maximum work 30 is able to condition air so that ultimately the air in the unoccupied roomspaces or zones 37 (point f) has a 75° dry bulb temperature and 30% relative humidity in the winter months, as shown in FIG. 4c.

Airside Conditions Summer Cycle Cooling and Dehumidification 1. 95° Fahrenheit to 48° Fahrenheit outside air 41 temperature and supply fan 42 heats the supply air 4° Fahrenheit.

2. 95° Fahrenheit to 86° Fahrenheit outside air 41 temperature, supply air runaround preheating/precooling coil 49A, return/exhaust air runaround heating/cooling coil 49B, VFD pump 9, T7, and T9 operated in concert to maintain an 86° Fahrenheit precooling coil 49A discharge temperature.

3. 86° Fahrenheit to 48° Fahrenheit outside air 41 temperature, T7, T2, T8, VFD pump 3, water from evaporator loop 35A to modulating three way mixing valve V1, pump 2, V4, rows 1–4 of the sprayed cooling coil 69, rows 5–8 of the recooling coil 69A, and back to the evaporator loop 35A, operate in concert to provide supply air 38 having a 48° Fahrenheit dry bulb, wet bulb, and dew point temperature. The supply air 38 duct 39 heat gain of 4° Fahrenheit reheats the supply air 38 to a 52° Fahrenheit dry bulb and a 48° Fahrenheit dew point temperature.

4. During high outside air 41 temperatures items 1, 2, and 3 occur simultaneously. As the outside air 41 temperature diminishes items 1 and 3 occur simultaneously.

Additionally, cooling and dehumidification is carried out using the same pipes used for the winter heating cycle. During the summer condition, the design may be for outside air 41 at a 95° Fahrenheit dry bulb temperature and a 75° Fahrenheit wet bulb temperature as shown by point i in FIG. 4c. Curve i–e shows the outside air cooling to 48° Fahrenheit as it is cooled by the apparatus for maximum work 30. The air is conditioned by the apparatus 30 until the condition of the air in the roomspaces or zones 37 (point f) of the unoccupied room or zone 37 is 75° dry bulb temperature and 30% relative humidity in the summer months.

Roomside Conditions

The supply air 38 is 0.15 cubic feet a minute per square foot, 20 cubic feet a minute per person. Air changes per hour=1.

Return air to induction unit 98 or fan coil unit 100 0.6 cubic feet a minute per square foot. Air changes per hour=4.

Total room air turnover=5 air changes per hour.

Also, the return/exhaust (R/E) air from each zone 37 is 0.15 cubic feet per minute per square foot. Air changes per hour=1. The zone 37 has balance pressure.

Thus, as shown in FIG. 4c, in either the summer or winter condition, the incoming outside air 41 is conditioned into supply air 38 and is brought to about a 48° Fahrenheit wet bulb, dry bulb, and dew point temperature. Additionally, there is a 4° Fahrenheit heat gain from the duct work and this thus raises the dry bulb temperature to 52° Fahrenheit. This is point $e^1$ shown the graph in FIG. 4. Now, point f on the graph shows the room or zone 37 condition in the unoccupied state. The dry bulb temperature is 75° Fahrenheit dry bulb temperature and there is 30% relative humidity. Point g indicates the room or zone 37 condition with in an internal latent load, and the room is at a comfortable 75° Fahrenheit dry bulb temperature and there is 45% relative humidity.

Continuing with FIG. 4c, reference point h indicates the entering water temperature to the roomside coil 138. The water temperature is about 2° Fahrenheit above the room dew point temperature of the air in the room or zone 37. As described above, because the temperature of the water in the roomside coils 138 is above the dew point temperature, all the roomside zone or room 37 cooling for the apparatus 30 is accomplished with dry roomside coils 138. Under normal operating conditions, this does away with the need to handle condensate water on the coils 138, as there is none, and does away with the need for messy condensate drain pans, and does away with the need for a condensate drainage system.

Thus, the apparatus for maximum work 30 is able to condition air so that ultimately, the condition of the air in the roomspaces or zones 37 (point f) of the unoccupied room or zone 37 is 75° dry bulb temperature and 30% relative humidity in the summer months and winter months, or in other words year round. Additionally, the apparatus 30 provides for winter humidification and summer dehumidification. Finally, the apparatus 30 uses the same coils for both the summer and winter conditions.

Boiler Heat

There may be times when the demand for heating is greater than can be supplied by the condenser 56, for example there may be a need to raise roomside zone or space 37 temperatures after a cold weekend or during low ambient temperatures. Here, the water heater 77, which may comprise a boiler, is turned on. The heat provided by the boiler is shown in the graph of FIG. 3 during the winter cycle of operation. For example and as shown, the boiler may provide hot water at a temperature of 120° Fahrenheit, and the boiler may raise the temperature to about 140° Fahrenheit. The water heater bypass pump 7 is activated, and pumps water from the hot supply/return pipe 62, through the boiler coil 78 and back to the hot supply/return pipe 62. The apparatus for maximum work 30 is thus able to generated additional heat to meet demand.

Salvage Energy

In the event all heating needs are met, useful heat energy is salvaged by a means for salvaging energy 93. As shown in FIG. 1g, hot supply/return water (HS/R) 62 is piped through salvage energy heat exchanger designated HX-2 in FIG. 1g. The hot supply/return water in the pipe 62 is pumped through the salvage energy heat exchanger HX-2 by the salvage energy heat exchanger bypass pump 10. The salvage piping loop 95 passes through the salvage energy heat exchanger designated HX-2 and absorbs heat energy. Then, the hot water in the salvage energy piping loop 95 may be pumped by the salvage energy pump 11 to locations where the heat may be used, for example for domestic hot water, by sidewalks in the winter months, for melting snow and space heating at off-site locations. This hot water may be piped to neighboring buildings. Thus, the apparatus for maximum work 30 makes use of all available energy, and discharges energy, as described above, after all other heating needs are satisfied.

Heat Removal

The refrigeration machine 40 may also be used to remove excess heat from the apparatus for maximum work 30. This may be done after all other heating needs are satisfied. As shown in FIG. 1g, the hot supply/return pipe (HS/R) 62 leading back to the condenser 56 comprises a hot water evaporative cooler loop 80 that passes through the hot water evaporative cooler heat exchanger designated HX-3 in FIG. 1g. As shown, a hot water evaporative cooler pump 13 or HX-3 bypass pump pumps hot water through the evaporative cooler heat exchanger HX-3 and back to the hot supply/return pipe 62. The hot water evaporative cooler loop 82 passes through HX-3, and the water held therein is pumped by the evaporative cooler loop pump 14. Ethylene glycol may also be pumped through the evaporative cooler loop 82. As the evaporative cooler pump 13 and hot water evaporative cooler pump 14 pump, heat from the apparatus 30 is removed through the evaporative cooler section 83.

The evaporative cooler section 83 comprises a tank 85, a pipe 86 leading from the tank 85, an evaporator cooler spray pump 15, and a pipe 86 leading from the tank 85 to nozzles 88. When the pump 14 is activated, hot water/glycol is pumped through the evaporative cooler loop 82, and the spray pump 15 sprays cooling water on the evaporative cooler cooling coil 89. As the evaporative cooler fan motor unit 90 spins it draws outside air 41 in through vents 92 and discharges it to the atmosphere as discharge air (DA) 91. As this occurs, the heat energy in the glycol in the evaporative cooler loop 82 is absorbed by the air the air is discharged into the atmosphere as discharge air DA 91. Also, the evaporative cooler expansion tank 94 allows the fluid in the evaporative cooler loop 82 to expand and contract. Thus, in this manner, excess heat can be removed from the apparatus for maximum work 30 by discharge to the atmosphere. The discharge of the return/exhaust section 50 also increases the efficiency of the evaporative cooler by discharging 50° Fahrenheit dewpoint air.

No Recirculation of Return Air

As described above, the apparatus for maximum work 30 does not recirculate supply air 38, which significantly reduces the likelihood of harmful fungi and other pathogens from living in the ducts 39. This is because the supply air 38 only comes from outside air 41. After the air flows through the apparatus 30 it becomes return/exhaust air 152 in the exhaust/return section 50. The return/exhaust fan motor unit 51 draws the return/exhaust air 152 into the evaporative cooler section 83 of the evaporative cooler 79. The evaporative cooler fan motor unit 90 discharges the return/exhaust air 152 through its grille and out of the evaporative cooler 79. The fan motor unit 90 also draws in outside air 41 though the vents 92. Both the return/exhaust air 152 and outside air 41 mix and are discharged together as discharge air 91. As shown, the arrow in FIG. 1 showing the return/exhaust air 152 flow points in the direction of return air flow. Thus, because return/exhaust air 152 is directly exhausted from the apparatus 30, a healthier and cleaner environment is provided, while at the same time energy is used very efficiently, as described above. This reduces power consumption of the apparatus 30 thus decreasing the expenses associated with operating the apparatus for maximum work 30.

Campus and District Heating and Cooling

Figure 5:
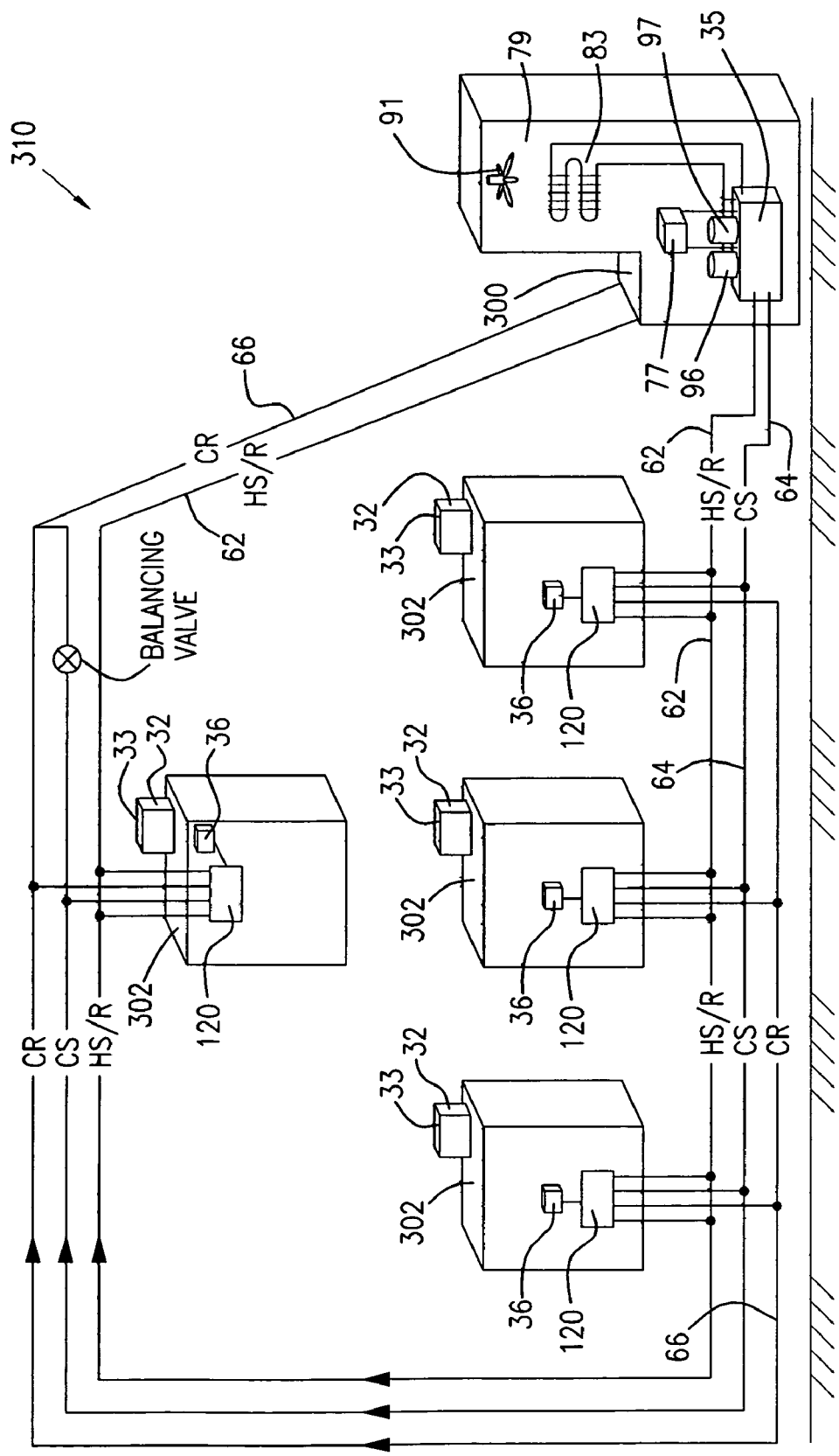
FIG. 5 shows a schematic or diagrammatic view of a layout of a campus or district using the apparatus for maximum work.

In another embodiment, shown diagrammatically in FIG. 5, the apparatus 30 may be used in a central heating and cooling plant 300. In such an embodiment, airside equipment 32 and roomside equipment 36 may be located in each building 302 served, and the central equipment (refrigeration machine 40, evaporative cooler 79, water heater 77, and related components) located in a separate central heating and refrigeration building 300. By way of example, if there is, for example a campus/district of buildings 310 in need of heating and cooling, they may be served by an underground 3-pipe distribution system. Takeoff/runout pipes to each building 302 in the campus 310 may connect to a hot supply/return pipe (HS/R) 62, a cold supply pipe (CS) 64, and a cold return pipe (CR) 66. The layout of the pipes may be as shown in FIG. 1, and air conditioning and heating service lines and building valve and pump assembly 120 as described above may be used in each building 302. The pressures and temperatures of the system water are such that in the embodiment SCH (Schedule) 10 piping may be considered for the campus or district system 310 piping. This type of district heating and cooling would be useful, as the individual campus buildings 302 would not need a refrigeration machine 40, a boiler 77, an evaporative cooler 79, and hot and cold storage tanks 96,97, respectively. However, each building 302 or structure in the campus 310 would have its own airside equipment room 33 and airside equipment 32, and roomside equipment 36, as described above. It is noted the plant 300 is located in close proximity to the road 315, which further decreases the costs associated with running utilities from the road 315 to the plant 300. Thus, the apparatus for maximum work 30 may be may be readily adapted for use in a campus/district setting.

Hence, the present 3-pipe distribution system diminishes piping costs compared to a 4-pipe distribution system. Additionally, the apparatus for maximum work 30 is efficient so all heating needs are satisfied before any heat is transferred out of the apparatus 30 to the atmosphere.

It will be appreciated by those skilled in the art that while the apparatus for maximum work 30 has been described above in connection with particular embodiments and examples, the apparatus for maximum work 30 is not necessarily so limited and other embodiments, examples, uses, and modifications and departures from the embodiments, examples, and uses may be made without departing from the apparatus for maximum work. All of these embodiments are intended to be within the scope and spirit of the this invention.

What is claimed:

1. An apparatus for maximum work comprising:
  a) refrigeration machine comprising a condenser for generating hot supply water and an evaporator for generating cold supply water;
  b) a water blending circuit;
  c) a hot supply/return piping loop connected to the condenser and the water blending circuit, a cold supply pipe connected to an evaporator primary loop and the water blending circuit, and a cold return pipe connected to the water blending circuit and the evaporator primary loop;

d) the water blending circuit comprising a hot supply runout pipe connected to the hot supply/return piping loop and a cold supply runout pipe connected to the cold supply pipe;

e) an upstream two position three way changeover valve connected to the hot supply runout pipe and the cold supply runout pipe, the upstream two position three way changeover valve for allowing hot water or cold water to flow through there-through;

f) a modulating three way zone blending valve located downstream from and connected to the upstream two position three way valve;

g) a blending pump connected to the modulating three way zone blending valve at a downstream location, h) a roomside coil connected to the blending pump, the blending pump for pumping water through the roomside coil;

i) a coil return pipe extending from the coil through which coil return water exits the coil, the coil return pipe connected to the modulating three way zone blending valve and connected to a downstream two position three way changeover valve, the modulating three way zone blending valve for allowing all, a portion of, or none of the coil return water to be returned by the blending pump and pumped through the roomside coil;

j) the downstream two position three way changeover valve connected to a cold return runout pipe and connected to a hot return runout pipe;

k) the cold return runout pipe connected to the cold return pipe that connects to the evaporator primary loop and is for returning cold water to the evaporator primary loop, and the hot return runout pipe is connected to the hot supply/return piping loop connected to the condenser and is for returning hot water to the condenser; and l) a means for control for controlling the refrigeration machine.

2. The apparatus for maximum work according to claim 1 further comprising:

a) an airside equipment room for generating and directing supply air and comprising an airside equipment coil; and b) ducts for directing the supply air to a zone or an area being conditioned and a zone thermostat for sensing an air temperature of the zone, and a return water thermostat for sensing a temperature of the coil return water, the return water thermostat for controlling the modulating three way zone blending valve to regulate the amount of coil return water repumped through the roomside coil.

3. The apparatus according to claim 2 wherein the modulating three way zone blending valve opens or closes in response to electronic instructions provided by the zone thermostat and return water thermostat to open or close to allow all, none, or a percentage of return coil water to be returned by the blending pump and recirculated through the roomside coil.

4. The apparatus for maximum work according to claim 1 further comprising airside equipment for generating and delivering supply air to a zone or room, and a duct through which the supply air flows.

5. The apparatus for maximum work according to claim 1 wherein the water blending circuit further comprises one of the following:

a) a fan coil unit;
b) a radiant ceiling; and
c) an induction unit.

6. The apparatus for maximum work according to claim 3 wherein for maximum cooling of the zone the zone thermostat and return water thermostat instruct the upstream two position three way valve to open to the flow of cold water and the modulating three way zone blending valve to open to the flow of cold water and close to the flow of coil return water and instructs the downstream three way two position changeover valve to direct all the coil return water to the cold return pipe.

7. The apparatus for maximum work according to claim 3 wherein for maximum heating of the zone the zone thermostat and return water thermostat instruct the upstream two position three way valve to open to the flow of hot water and instructs the modulating three way zone blending valve open to the flow of hot water and close to the flow of coil return water and instructs the downstream three way two position changeover valve to direct the coil return water to the hot supply/return pipe.

8. The apparatus for maximum work according to claim 1 further comprising a means for control for automatically controlling the refrigeration machine and water blending circuit.

9. The apparatus for maximum work according to claim 1 wherein the cold supply water is delivered to the water blending circuit at about 52° Fahrenheit year round.

10. The apparatus for maximum work according to claim 9 further comprising a roomside cold water loop comprising a modulating three way mixing valve for the roomside cold water loop, one port of the modulating three way mixing valve for the roomside cold water loop connected to the cold water return and the other port of the modulating three way mixing valve for the roomside cold water pipe connected to the cold supply piping loop, a cold variable frequency drive cold water pump and a cold water supply to roomside equipment pressure controller for controlling the variable frequency drive cold water pump at a constant pressure, and a thermostat for modulating three way mixing valve for the cold water loop so that cold supply water at about 52° Fahrenheit is delivered to the water blending circuit year round.

11. The apparatus for maximum work according to claim 1 wherein the airside equipment is for the supply air to the roomside equipment and the supply air has about a 48° Fahrenheit dry bulb temperature, about a 48° Fahrenheit wet bulb temperature, and about a 48° Fahrenheit dew point temperature year-round.

12. The apparatus for maximum work according to claim 2 further comprising a campus of buildings wherein the refrigeration machine, a boiler, an evaporative cooler, and a hot storage tank and a cold storage tank are located in a central equipment heating/cooling plant building and an airside equipment unit is installed in each building in the campus, and wherein the hot supply/return piping loop, the cold supply pipe, and the cold return pipe extend to and from the central equipment heating/cooling plant building to the campus buildings.

13. An apparatus for maximum work comprising:

a) an airside equipment room comprising airside equipment for providing supply air;

b) roomside equipment including a fan coil unit comprising a coil and having a fan for blowing the supply air through the coil, an induction unit, and a radiant ceiling;

c) a water blending circuit in fluid communication with the roomside equipment and for providing water to the coil of roomside equipment;

d) a refrigeration machine, a hot supply/return pipe leading from the refrigeration machine, a cold supply pipe leading to and from the refrigeration machine, and a cold return pipe leading back to the refrigeration machine; and e) the water blending circuit comprising an upstream two position three way changeover valve connected to the hot supply runout pipe and the cold supply runout pipe, the upstream two position three way changeover valve for allowing hot water or cold water to flow through there-through, and the water blending circuit further comprising a modulating three way zone blending valve located downstream from and connected to the upstream two position three way valve, and the water blending circuit further comprising a blending pump connected to the modulating three way zone blending valve at a downstream location and for pumping water through the coil, the water blending circuit further comprising a coil return pipe extending from the coil and connected to the modulating three way zone blending valve and connected to a downstream two position three way changeover valve, the modulating three way zone blending valve for allowing all, a portion of, or none of the coil return water to be returned by the blending pump and pumped through the roomside coil, and the downstream two position three way changeover valve connected the hot supply/return pipe and the cold return pipe.

14. A method of conditioning air with an apparatus for maximum work comprising the acts of:

a) providing central equipment comprising a refrigeration machine, the refrigeration machine for generating hot supply water and cold supply water;

b) providing piping comprising a hot supply/return piping loop extending to and from the refrigeration machine, a cold supply pipe extending from the refrigeration machine, and a cold return pipe returning to the refrigeration machine;

c) providing roomside equipment comprising a water blending circuit comprising a hot supply runout pipe extending from the hot supply/return pipe and a cold supply runout pipe extending from the cold supply pipe;

d) providing the water blending circuit with an upstream two position three way changeover valve comprising a first port, a second port, and a third port, wherein the hot supply runout pipe connects to first port and the cold supply runout pipe connects to the second port, the upstream two position three way changeover valve for allowing hot water or cold water to flow there-though;

e) providing a modulating three way zone blending valve connected to the third port of the upstream two position three way changeover valve at a location downstream of the upstream two position three way changeover valve;

f) providing a blending pump located at a downstream location of the modulating three way zone blending valve;

g) providing a roomside coil downstream of the blending pump and blowing supply air to a room zone through the roomside coil, the blending pump for pumping water though the roomside coil, so that return water exits the coil through a return pipe;

h) positioning a zone thermostat in a zone being conditioned to sense a temperature of the zone, and providing a return water thermostat to sense a temperature of the coil return water, the return water thermostat for controlling the amount of coil return water that is recirculated through the coil by controlling the amount that the modulating three way zone blending valve is open or closed to the flow of coil return water; and i) providing a downstream two position three way changeover valve connected to the return pipe, and connecting a hot water return runout pipe and a cold water return runout pipe to the downstream two position three way changeover valve to complete the blending circuit.

* * * * *

UNITED STATES PATENT AND TRADEMARK OFFICE
CERTIFICATE OF CORRECTION

PATENT NO. : 6,976,524 B2
DATED : December 20, 2005
INVENTOR(S) : Paul J. Walsh

It is certified that error appears in the above-identified patent and that said Letters Patent is hereby corrected as shown below:

Column 6,
Line 8, change "400" to -- 40º --.

Column 13,
Line 4, change "640" to -- 64º --.

Signed and Sealed this

Fourteenth Day of March, 2006

JON W. DUDAS
*Director of the United States Patent and Trademark Office*